(12) United States Patent
Park et al.

(10) Patent No.: US 9,596,660 B2
(45) Date of Patent: Mar. 14, 2017

(54) METHOD FOR TRANSMITTING AND RECEIVING RANDOM ACCESS PREAMBLE AND DEVICE THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/029,265

(22) PCT Filed: Oct. 8, 2014

(86) PCT No.: PCT/KR2014/009472
§ 371 (c)(1),
(2) Date: Apr. 14, 2016

(87) PCT Pub. No.: WO2015/056924
PCT Pub. Date: Apr. 23, 2015

(65) Prior Publication Data
US 2016/0255591 A1    Sep. 1, 2016

(30) Foreign Application Priority Data

Oct. 14, 2013   (KR) .................... 10-2013-0122198
Oct. 15, 2013   (KR) .................... 10-2013-0122407
(Continued)

(51) Int. Cl.
*H04W 52/50* (2009.01)
*H04W 52/24* (2009.01)
(Continued)

(52) U.S. Cl.
CPC ......... *H04W 52/242* (2013.01); *H04W 4/005* (2013.01); *H04W 52/50* (2013.01); *H04W 74/0833* (2013.01)

(58) Field of Classification Search
CPC .................... H04W 52/50; H04W 74/0833
(Continued)

(56) References Cited

U.S. PATENT DOCUMENTS

2007/0115872 A1   5/2007  Kim et al.
2011/0051609 A1   3/2011  Ishii et al.
(Continued)

FOREIGN PATENT DOCUMENTS

EP        1892972 A1       2/2008
KR    10-2011-0083535 A    7/2011

*Primary Examiner* — John J Lee
(74) *Attorney, Agent, or Firm* — IP Legal Services, LLC

(57) ABSTRACT

Provided are a method and a device for setting a repetition level of a random access preamble and determining transmission power for each random access preamble, when a random access preamble for an MTC terminal is repetitively transmitted and received to increase the transmission and reception performance of a random access preamble for a coverage-restricted MTC terminal. Provided are also a method and a device for controlling transmission power for a random access preamble when a terminal, located in improved coverage compared to the coverage for a general terminal, repetitively transmits the random access preamble. When the terminal repetitively transmits a PRACH through a plurality of uplink subframes, the terminal can determine the repetition number of transmitting the PRACH, determine transmission power for the PRACH based on the determined repetition number, and transmit the PRACH at the transmission power determined for the PRACH.

4 Claims, 30 Drawing Sheets

(30) Foreign Application Priority Data

| | | |
|---|---|---|
| Oct. 31, 2013 | (KR) | 10-2013-0131555 |
| Jun. 5, 2014 | (KR) | 10-2014-0068628 |
| Jul. 15, 2014 | (KR) | 10-2014-0088926 |

(51) Int. Cl.
*H04W 74/08* (2009.01)
*H04W 4/00* (2009.01)

(58) Field of Classification Search
USPC .............. 455/522, 434, 515, 69, 509, 452.1
See application file for complete search history.

(56) References Cited

U.S. PATENT DOCUMENTS

| | | | |
|---|---|---|---|
| 2012/0281580 A1 | 11/2012 | Lee et al. | |
| 2012/0309419 A1 | 12/2012 | Lee et al. | |
| 2013/0010768 A1 | 1/2013 | Lee et al. | |
| 2013/0035084 A1* | 2/2013 | Song | H04W 74/0833 455/418 |
| 2015/0085717 A1* | 3/2015 | Papasakellariou | H04L 5/14 370/280 |
| 2016/0183231 A1* | 6/2016 | Shi | H04L 1/02 370/329 |

* cited by examiner

*FIG.4*

| PREAMBLE FORMAT | DELTA_PREAMBLE VALUE |
|---|---|
| 0 | 0 DB |
| 1 | 0 DB |
| 2 | -3 DB |
| 3 | -3 DB |
| 4 | 8 DB |

FIG.8

| PREAMBLE REPETITION LEVEL | NUMBER OF REPETITION |
|---|---|
| 1 | $M_1$ |
| 2 | $M_2$ |
| ... | ... |
| N | $M_N$ |

FIG.9

| PREAMBLE REPETITION LEVEL | NUMBER OF REPETITION | PATHLOSS THRESHOLD |
|---|---|---|
| 1 | $M_1$ | $PL_{a,1}$ |
| 2 | $M_2$ | $PL_{a,2}$ |
| ... | ... | ... |
| N | $M_N$ | $PL_{a,N}$ |

FIG.12

| PREAMBLE REPETITION LEVEL | NUMBER OF REPETITION | COVERAGE LEVEL |
|---|---|---|
| 1 | $M_1$ | $CL_{c,1}$ |
| 2 | $M_2$ | $CL_{c,2}$ |
| ... | ... | ... |
| N | $M_N$ | $CL_{c,N}$ |

FIG.13

| PREAMBLE REPETITION LEVEL | NUMBER OF REPETITION | COVERAGE LEVEL |
|---|---|---|
| 1 | $M_1$ | $CL_{c,1}$ |
| 2 | $M_2$ | $CL_{c,2}$ |
| 3 | $M_3$ | |
| 4 | $M_4$ | $CL_{c,3}$ |
| 5 | $M_5$ | |

FIG.19

| PREAMBLE REPETITION LEVEL | NUMBER OF REPETITION |
|---|---|
| 1 | 1 |
| 2 | 2 |
| ... | ... |
| N | $2^{(N-1)}$ |

*FIG.22*

| PREAMBLE REPETITION LEVEL | DELTA_PREAMBLE_REPETITION |
|---|---|
| 1 | $D_1$ |
| 2 | $D_2$ |
| ... | ... |
| N | $D_N$ |

FIG.23

| PREAMBLE REPETITION LEVEL | PREAMBLE INITIAL RECEIVED TARGET POWER |
|---|---|
| 1 | PREAMBLE INITIAL RECEIVED TARGET POWER 1 |
| 2 | PREAMBLE INITIAL RECEIVED TARGET POWER 2 |
| ... | ... |
| N | PREAMBLE INITIAL RECEIVED TARGET POWER N |

FIG.24

| PREAMBLE REPETITION LEVEL | POWER RAMPING STEP |
|---|---|
| 1 | POWER RAMPING STEP 1 |
| 2 | POWER RAMPING STEP 2 |
| ... | ... |
| N | POWER RAMPING STEP N |

METHOD FOR TRANSMITTING AND RECEIVING RANDOM ACCESS PREAMBLE AND DEVICE THEREFOR

CROSS REFERENCE TO RELATED APPLICATIONS

This application is a National Stage Patent Application of PCT International Patent Application No. PCT/KR2014/009472 (filed on Oct. 8, 2014) under 35 U.S.C. §371, which claims priority to Korean Patent Application Nos. 10-2013-0122198 (filed on Oct. 14, 2013), 10-2013-0122407 (filed on Oct. 15, 2013), 10-2013-0131555 (filed on Oct. 31, 2013), 10-2014-0068628 (filed on Jun. 5, 2014), and 10-2014-0088926 (filed on Jul. 15, 2014), the teachings of which are incorporated herein in their entireties by reference.

TECHNICAL FIELD

The present disclosure relates to a method and a device for transmitting and receiving a random preamble in a wireless communication system and, more particularly, to a method and a device for configuring a repetition level of a random access preamble and controlling a transmission power when a terminal is located in an improved coverage as compared with a coverage for a typical terminal and when the terminal repeatedly transmits the random access preamble for improving the coverage.

In addition, the present disclosure relates to a method and a device for controlling a transmission power of a random access preamble in a wireless communication system and, more particularly, to a method and a device for controlling a transmission power of a random access preamble when a terminal is located in an improved coverage as compared with a coverage for a typical terminal and when the terminal repeatedly transmits and receives the random access preamble.

BACKGROUND ART

A machine type communication (MTC) is data communication between one device to the other device or between machine to machine without human interaction. That is, the MTC denotes communication schemes for performing a communication without human intervention in a communication process.

An MTC terminal may be generally installed in a place having an inferior radio propagation environment, as compared to a typical terminal. In order for an MTC terminal to operate in such an inferior radio propagation environment, it may require to repeatedly transmit control information and/or data of each physical channel through a plurality of subframes, which have been typically transmitted only in a unit of one subframe.

Meanwhile, since a random access preamble for a typical terminal has not been repeatedly transmitted through a plurality of subframes, it is necessary to develop a procedure of repeatedly transmitting and receiving a random access preamble for an MTC terminal.

In addition, since a typical terminal does not repeatedly transmit a random access preamble in a plurality of subframes, a transmission power of the random access preamble may be determined without considering that the random access preamble is repeatedly transmitted.

DETAILED DESCRIPTION OF THE INVENTION

Technical Problem

The purpose of the present disclosure is to provide a method and a device for configuring a repetition level of a random access preamble and determining a transmission power of each random access preamble when a random access preamble for an MTC terminal is repeatedly transmitted and received in order to improve the performance of a transmission and reception for the random access preamble of the coverage-limited MTC terminal.

In addition, the purpose of the present disclosure is to provide a method for controlling a transmission power of a random access preamble when an MTC terminal repeatedly transmits the random access preamble in a plurality of subframes in order to overcome the problem described above.

Technical Solution

An embodiment of the present disclosure provides a method of performing random access by a terminal. The method may include: determining a preamble repetition level by one of i) at least one of parameters that determine a transmission power of a random access preamble and ii) a coverage level; repeatedly transmitting a random access preamble to a base station through a predetermined number of subframes corresponding to the determined preamble repetition level; and receiving, from the base station, a random access response related to the random access preamble, wherein when the random access response has not been received from the base station, the transmitting of the random access preamble to the base station is repeated. The method may further include determining a preamble repetition level by a downlink path loss value ($PL_c$). The method may further include determining a preamble repetition level by a maximum transmission power ($P_{CMAX,c}(i)$) of a terminal, a downlink path loss value ($PL_c$), preambleInitialReceivedTargetPower, and a function of DELTA_PREAMBLE. The method may further include determining a coverage level by a repetition number of a downlink physical channel or a terminal-specific upper layer signaling. The method may further include modifying a preamble repetition level and repeatedly transmitting a random access preamble to a base station when a random access response is not received from the base station and thus repeatedly transmitting the random access preamble to the base station. The method may further include repeatedly transmitting a random access preamble to a base station by increasing a preamble repetition level by one when a random access response is not received from the base station and thus repeatedly transmitting the random access preamble to the base station. In case of repeating the transmitting of the random access preamble because the random access response is not received from the base station, the random access preamble is repeatedly transmitted to the base station by i) ramping a transmission power whenever $M_n$ number of random access preambles corresponding to the preamble repetition level n (n is a whole number greater than one) are repeatedly transmitted to the base station and ii) increasing the preamble repetition level when a predetermined condition is satisfied while the ramping is performing. The predetermined condition is satisfied i) when PREAMBLE_TRANSMISSION_COUNTER used for determining the transmission power of the random access preamble reaches a threshold value by increasing the PREAMBLE_TRANSMISSION_COUNTER by one or ii) when a transmission power for each random access preamble transmission reaches $P_{CMAX,c}(i)$. In accordance with another embodiment of the present disclosure, a terminal may be provided for performing random access. The terminal may include a transmission unit and a reception unit. The transmission unit may be configured to repeatedly transmit a random access preamble to a base station through a predetermined number of subframes corresponding to a preamble repetition level that is determined according to one of i) at least one of parameters that determine a transmission power of the random access preamble and ii) a coverage level. The reception unit may be configured to receive, from the base station, a random access response related to the random access preamble. When the reception unit has not received the random access response from the base station, the transmission unit repeats the transmitting of the random access preamble to the base station. In addition, provided is a terminal wherein a preamble repetition level is determined by a downlink path loss value ($PL_c$). The preamble repetition level is determined based on a maximum transmission power ($P_{CMAX,c}(i)$) of the terminal, a downlink path loss value ($PL_c$) preambleInitialReceivedTargetPower, and a function of DELTA_PREAMBLE. A coverage level is determined by a repetition number of a downlink physical channel or a terminal-specific upper layer signaling. A preamble repetition level is changed and a random access preamble is repeatedly transmitted to the base station when the random access response cannot be received from a base station and thus the random access preamble is repeatedly transmitted to the base station. A random access preamble is repeatedly transmitted to a base station by increasing the preamble repetition level by one when a random access response cannot be received from the base station and thus the random access preamble repeatedly transmitted to the base station. The terminal repeatedly transmits, to a base station, a random access preamble by increasing a preamble repetition level when a predetermined condition is satisfied while ramping a transmission power whenever repeatedly transmitting, to the base station, $M_n$ number of random access preambles corresponding to the preamble repetition level n (n is a whole number larger than 1) when a random access response cannot be received from a base station and thus repeatedly transmitting the random access preamble to the base station. Further, provided is a terminal wherein a predetermined condition increases, by one, a PREAMBLE_TRANSMISSION_COUNTER used for determining a transmission power of a random access preamble and the PREAMBLE_TRANSMISSION_COUNTER thus reaches a predetermined number, or a transmission power for transmitting each random access preamble reaches $P_{CMAX,c}(i)$. Further, a random access preamble is repeatedly transmitted to a base station by increasing a preamble repetition level by one.

In accordance with an embodiment of the present disclosure, a method may be provided for transmitting a random access preamble through a random access channel (Physical Random Access Channel, PRACH) by a terminal. The provided method may include: determining a repetition number of repeatedly transmitting the PRACH when the PRACH is repeatedly transmitted through a plurality of uplink subframes, and determining a transmission power of the PRACH based on the determined repetition number; and repeatedly transmitting the PRACH using the determined transmission power of the PRACH. The method further includes: increasing the transmission power of the PRACH when a repeated transmission of the PRACH fails; repeatedly transmitting the PRACH using the increased transmission power of the PRACH when the increased transmission power of the PRACH is equal to or less than a maximum transmission power; and repeatedly transmitting the PRACH by increasing the repetition number when the increased transmission power of the PRACH is greater than a maximum transmission power. The method further includes: increasing the repetition number when a transmission of the PRACH fails; repeatedly transmitting the PRACH for the increased repetition number when the increased repetition number is equal to or less than a maximum value; and repeatedly transmitting the PRACH by increasing the transmission power of the PRACH when the increased repetition number is greater than a maximum value. The transmission power of the PRACH is determined using the equation (1) described below, $$P_{PRACH}=\min\{P_{CMAX,c}(i),\text{PREAMBLE\_RECEIVED\_TARGET\_POWER}+PL_c-10\log M_n\}\_[\text{dBm}] \quad (1)$$

wherein, in the above equation (1), $P_{PRACH}$ is the transmission power of the PRACH, $P_{CMAX,c}(i)$ is a maximum transmission power, PREAMBLE_RECEIVED_TARGET_POWER is a target preamble reception power, $PL_c$ is a downlink path loss, and $M_n$ is the number of times that the PRACH is repeatedly transmitted. the method further includes determining the transmission power of the PRACH determines the transmission power of the PRACH using the equation (2) described below, $$P_{PRACH}=\min\{P_{CMAX,c}(i),\text{PREAMBLE\_RECEIVED\_TARGET\_POWER}+PL_c\}\_[\text{dBm}] \quad (2)$$

wherein, in the above equation (2), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (3) described below, PREAMBLE_RECEIVED_TARGET_POWER=
preambleInitioalReceivedTargetPower+DELTA_PREAMBLE+DELTA_PREAMBLE_REPETITION+(PREAMBLE_TRANSMISSION_COUNTER−1)*powerRampingStep (3)

wherein, in the above equation (3), preambleInitioalReceivedTargetPower and powerRampingStep are values received by an upper layer signaling, DELTA_PREAMBLE is a value determined according to a format of the random access preamble, DELTA_PREAMBLE_REPETITION is a value determined based on the number of times that the PRACH is repeatedly transmitted, and PREAMBLE_TRANSMISSION_COUNTER is the number of times that a transmission of the PRACH is attempted. The method further includes determining the transmission power of the PRACH determines the transmission power of the PRACH using the equation (4) described below, $$P_{PRACH}=\min\{P_{CMAX,c}(i),\text{PREAMBLE\_RECEIVED\_TARGET\_POWER}+PL_c\}\_[\text{dBm}] \quad (4)$$

wherein, in the above equation (4), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (5) described below, PREAMBLE_RECEIVED_TARGET_POWER=
preambleInitioalReceivedTargetPower+DELTA_PREAMBLE+(PREAMBLE_TRANSMISSION_COUNTER−1)*powerRampingStep (5)

wherein, in the above equation (5), preambleInitioalReceivedTargetPower and powerRampingStep are values received by an upper layer signaling, DELTA_PREAMBLE is a value determined according to a format of the random access preamble, PREAMBLE_TRANSMISSION_COUNTER is the number of times that a transmission of the PRACH is attempted, and the preambleInitioalReceivedTargetPower is determined, by the base station, based on the number of times that the PRACH is repeatedly transmitted. Further, provided is the method wherein determining the transmission power of the PRACH determines the transmission power of the PRACH using the equation (6) described below, $$P_{PRACH} = \min\{P_{CMAX,c}(i), \text{PREAMBLE\_RECEIVED\_TARGET\_POWER} + PL_c\}\_[dBm] \quad (6)$$

wherein, in the above equation (6), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (7) described below, $$\text{PREAMBLE\_RECEIVED\_TARGET\_POWER} = \text{preambleInitioalReceivedTargetPower} + \text{DELTA\_PREAMBLE} + (\text{PREAMBLE\_TRANSMISSION\_COUNTER} - 1) * \text{powerRampingStep} \quad (7)$$

wherein, in the above equation (7), preambleInitioalReceivedTargetPower and powerRampingStep are values received by an upper layer signaling, DELTA_PREAMBLE is a value determined according to a format of the random access preamble, PREAMBLE_TRANSMISSION_COUNTER is the number of times that a transmission of the PRACH is attempted, and powerRampingStep is adjusted, by the terminal, based on the number of times that the PRACH is repeatedly transmitted, or determined, by the base station, based on the number of times that the PRACH is repeatedly transmitted.

In accordance with another embodiment of the present disclosure, a method may be provided for transmitting, by a base station, configuration information on a transmission power of a random access channel (Physical Random Access Channel, PRACH), to a terminal. The method may include determining, by the terminal, the configuration information on the transmission power of the PRACH based on a repetition number of transmitting the PRACH; and transmitting, to the terminal, the configuration information on the transmission power of the PRACH through an upper layer signaling. The transmission power of the PRACH is determined, by the terminal, using the equation (8) described below, $$P_{PRACH} = \min\{P_{CMAX,c}(i), \text{PREAMBLE\_RECEIVED\_TARGET\_POWER} + PL_c\}\_[dBm] \quad (8)$$

wherein, in the above equation (8), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (9) described below, $$\text{PREAMBLE\_RECEIVED\_TARGET\_POWER} = \text{preambleInitioalReceivedTargetPower} + \text{DELTA\_PREAMBLE} + (\text{PREAMBLE\_TRANSMISSION\_COUNTER} - 1) * \text{powerRampingStep} \quad (9)$$

wherein, in the above equation (9), preambleInitioalReceivedTargetPower and powerRampingStep are values received by an upper layer signaling, DELTA_PREAMBLE is a value determined according to a format of the random access preamble, PREAMBLE_TRANSMISSION_COUNTER is the number of times that a transmission of the PRACH is attempted, and the configuration information on the transmission power of the PRACH, that is determined based on the number of times that the PRACH is repeatedly transmitted, is preambleInitioalReceivedTargetPower. In addition, provided is a method wherein the transmission power of the PRACH is determined, by the terminal, using the equation (10) described below, $$P_{PRACH} = \min\{P_{CMAX,c}(i), \text{PREAMBLE\_RECEIVED\_TARGET\_POWER} + PL_c\}\_[dBm] \quad (10)$$

wherein, in the above equation (10), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (11) described below, $$\text{PREAMBLE\_RECEIVED\_TARGET\_POWER} = \text{preambleInitioalReceivedTargetPower} + \text{DELTA\_PREAMBLE} + (\text{PREAMBLE\_TRANSMISSION\_COUNTER} - 1) * \text{powerRampingStep} \quad (11)$$

wherein, in the above equation (11), preambleInitioalReceivedTargetPower and powerRampingStep are values received by an upper layer signaling, DELTA_PREAMBLE is a value determined according to a format of the random access preamble, PREAMBLE_TRANSMISSION_COUNTER is the number of times to attempt to transmit the PRACH by the terminal, and configuration information on the transmission power of the PRACH determined based on the number of times to repeatedly transmit the PRACH is powerRampingStep.

In accordance with another embodiment of the present disclosure, a terminal may be provided for transmitting a random access preamble through a random access channel (Physical Random Access Channel, PRACH). The terminal may include: a control unit configured to determine a repetition number of transmitting the PRACH when the PRACH is repeatedly transmitted through a plurality of uplink subframes, and determine the transmission power of the PRACH based on the determined repetition number; and a transmission unit configured to repeatedly transmit the PRACH using the determined transmission power of the PRACH. The control unit: increases the transmission power of the PRACH when a repeated transmission of the PRACH fails; repeatedly transmits the PRACH using the increased transmission power of the PRACH when the increased transmission power of the PRACH is equal to or lower than a maximum transmission power; and increases the number of times that the PRACH is to be repeatedly transmitted and repeatedly transmits the PRACH when the increased transmission power of the PRACH is greater than a maximum transmission power. The control unit: increases the number of times that the PRACH is to be repeatedly transmitted when a transmission of the PRACH fails; repeatedly transmits the PRACH for the increased number of times to repeatedly transmit the PRACH when the increased number of times to repeatedly transmit the PRACH is equal to or lower than a maximum value; and increases the transmission power of the PRACH and repeatedly transmits the PRACH when the increased number of times to repeatedly transmit the PRACH is greater than a maximum value. The control unit determines the transmission power of the PRACH using the equation (12) described below, $$P_{PRACH} = \min\{P_{CMAX,c}(i), \text{PREAMBLE\_RECEIVED\_TARGET\_POWER} + PL_c - 10 \log M_n\}\_[dBm] \quad (12)$$

wherein, in the above equation (12), $P_{PRACH}$ is the transmission power of the PRACH, $P_{CMAX,c}(i)$ is a maximum transmission power, PREAMBLE_RECEIVED_TARGET_POWER is a reception power of a target preamble, $PL_c$ is a downlink path loss, and $M_n$ is the number of times that the PRACH is to be repeatedly transmitted. Further, provided is a terminal wherein the control unit determines the transmission power of the PRACH using the equation (13) described below, $$P_{PRACH}=\min\{P_{CMAX,c}(i),\text{PREAMBLE}\_\text{RECEIVED}\_\text{TARGET}\_\text{POWER}+PL_c\}\_[\text{dBm}] \quad (13)$$

wherein, in the above equation (13), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (14) described below, PREAMBLE_RECEIVED_TARGET_POWER=
preambleInitioalReceivedTargetPower+DEL-
TA_PREAMBLE+DELTA_PREAMBLE_REPE-
TITION+(PREAMBLE_TRANSMISSION_
COUNTER−1)*powerRampingStep (14)

wherein, in the above equation (14), preambleInitioalReceivedTargetPower and powerRampingStep are values that are received by an upper layer signaling, DELTA_PREAMBLE is a value determined based on the format of a random access preamble, DELTA_PREAMBLE_REPETITION is a value determined based on the number of times that the PRACH is to be repeatedly transmitted, and PREAMBLE_TRANSMISSION_COUNTER is the number of times to attempt to transmit the PRACH. Further, provided is a terminal wherein the control unit determines the transmission power of the PRACH using the equation (15) described below, $$P_{PRACH}=\min\{P_{CMAX,c}(i),\text{PREAMBLE}\_\text{RECEIVED}\_\text{TARGET}\_\text{POWER}+PL_c\}\_[\text{dBm}] \quad (15)$$

wherein, in the above equation (15), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (16) described below, PREAMBLE_RECEIVED_TARGET_POWER=
preambleInitioalReceivedTargetPower+DEL-
TA_PREAMBLE+DELTA_PREAMBLE_REPE-
TITION+(PREAMBLE_TRANSMISSION_
COUNTER−1)*powerRampingStep (16)

wherein, in the above equation (16), preambleInitioalReceivedTargetPower and powerRampingStep are values that are received by an upper layer signaling, DELTA_PREAMBLE is a value determined based on the format of a random access preamble, PREAMBLE_TRANSMISSION_COUNTER is the number of times to attempt to transmit the PRACH, and the preambleInitioalReceivedTargetPower is determined based on the number of times that the PRACH is to be repeatedly transmitted by a base station. The control unit determines the transmission power of the PRACH using the equation (17) described below, $$P_{PRACH}=\min\{P_{CMAX,c}(i),\text{PREAMBLE}\_\text{RECEIVED}\_\text{TARGET}\_\text{POWER}+PL_c\}\_[\text{dBm}] \quad (17)$$

wherein, in the above equation (17), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (18) described below, PREAMBLE_RECEIVED_TARGET_POWER=
preambleInitioalReceivedTargetPower+DEL-
TA_PREAMBLE+(PREAMBLE_TRANSMIS-
SION_COUNTER−1)*powerRampingStep (18)

wherein, in the above equation (18), preambleInitioalReceivedTargetPower and powerRampingStep are values that are received by an upper layer signaling, DELTA_PREAMBLE is a value determined based on the format of a random access preamble, PREAMBLE_TRANSMISSION_COUNTER is the number of times to attempt to transmit the PRACH, and powerRampingStep is adjusted based on the number of times that the PRACH is to be repeatedly transmitted by the terminal or based on the number of times that the PRACH is to be repeatedly transmitted by a base station.

In accordance with another embodiment of the present disclosure, a base station may be provided for transmitting, to a terminal, configuration information on a transmission power of a random access channel (Physical Random Access Channel, PRACH). The base station including: a control unit configured to determine, by the terminal, the configuration information on the transmission power of the PRACH based on a repetition number of transmitting the PRACH; and a transmission unit configured to transmit, to the terminal, the configuration information on the transmission power of the PRACH through an upper layer signaling. In addition, provided is a base station wherein the terminal determines the transmission power of the PRACH using the equation (19) described below, $$P_{PRACH}=\min\{P_{CMAX,c}(i),\text{PREAMBLE}\_\text{RECEIVED}\_\text{TARGET}\_\text{POWER}+PL_c\}\_[\text{dBm}] \quad (19)$$

wherein, in the above equation (19), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (20) described below, PREAMBLE_RECEIVED_TARGET_POWER=
preambleInitioalReceivedTargetPower+DEL-
TA_PREAMBLE+(PREAMBLE_TRANSMIS-
SION_COUNTER−1)*powerRampingStep (20)

wherein, in the above equation (20), preambleInitioalReceivedTargetPower and powerRampingStep are values that are transmitted by an upper layer signaling, DELTA_PREAMBLE is a value determined based on the format of a random access preamble, PREAMBLE_TRANSMISSION_COUNTER is the number of times to attempt to transmit the PRACH by the terminal, and configuration information on the transmission power of the PRACH determined based on the number of times that the PRACH is to be repeatedly transmitted is preambleInitioalReceivedTargetPower. Further, provided is a base station wherein the terminal determines the transmission power of the PRACH using the equation (21) described below, $$P_{PRACH}=\min\{P_{CMAX,c}(i),\text{PREAMBLE}\_\text{RECEIVED}\_\text{TARGET}\_\text{POWER}+PL_c\}\_[\text{dBm}] \quad (21)$$

wherein, in the above equation (21), $P_{PRACH}$ is the transmission power of the PRACH, $P_{CMAX,c}(i)$ is a maximum transmission power, $PL_c$ is a downlink path loss, and PREAMBLE_RECEIVED_TARGET_POWER is determined using the equation (22) described below, PREAMBLE_RECEIVED_TARGET_POWER=
preambleInitioalReceivedTargetPower+DEL-
TA_PREAMBLE+(PREAMBLE_TRANSMIS-
SION_COUNTER−1)*powerRampingStep (22)

wherein, in the above equation (22), preambleInitioalReceivedTargetPower and powerRampingStep are values that are transmitted by an upper layer signaling, DELTA_PREAMBLE is a value determined based on the format of a random access preamble, PREAMBLE_TRANSMISSION_COUNTER is the number of times to attempt to transmit the PRACH by the terminal, and configuration information on the transmission power of the PRACH determined based on the number of times that the PRACH is to be repeatedly transmitted is powerRampingStep.

Advantageous Effects

According to at least one embodiment of the described present disclosure, a performance of a coverage-limited terminal for transmitting and receiving a random access preamble may be improved by repeatedly transmitting and receiving the random access preamble of the coverage-limited terminal.

In addition, according at least one embodiment of to the present disclosure, a method may be provided for controlling a transmission power of a random access preamble when an MTC terminal repeatedly transmits the random access preamble in a plurality of subframes.

BRIEF DESCRIPTION OF THE DRAWINGS

FIG. 4 is a table indicating a DELTA_PREAMBLE value that is a parameter used when a transmission power of a random access preamble is determined, for a normal terminal;

FIG. 8 is a table indicating an example of the relationship between a preamble repetition level and the repetition number of a random access preamble;

FIG. 9 is a table indicating an example of the relationship among a preamble repetition level, the repetition number of a random access preamble, and a path loss value;

FIG. 12 is a table indicating an example of the relationship among a preamble repetition level, the repetition number of a random access preamble, and a coverage level;

FIG. 13 is a table indicating another example of the relationship among a preamble repetition level, the repetition number of a random access preamble, and a coverage level;

FIG. 19 is a table illustrating an example of the table in FIG. 8.

FIG. 22 is a table indicating an embodiment of a parameter transmitted through an upper layer signaling, in FIG. 21;

FIG. 23 is a table indicating another embodiment of a parameter transmitted through an upper layer signaling, in FIG. 21;

FIG. 24 is a table indicating another embodiment of a parameter transmitted through an upper layer signaling, in FIG. 21;

MODE FOR CARRYING OUT THE INVENTION

Figure 1:
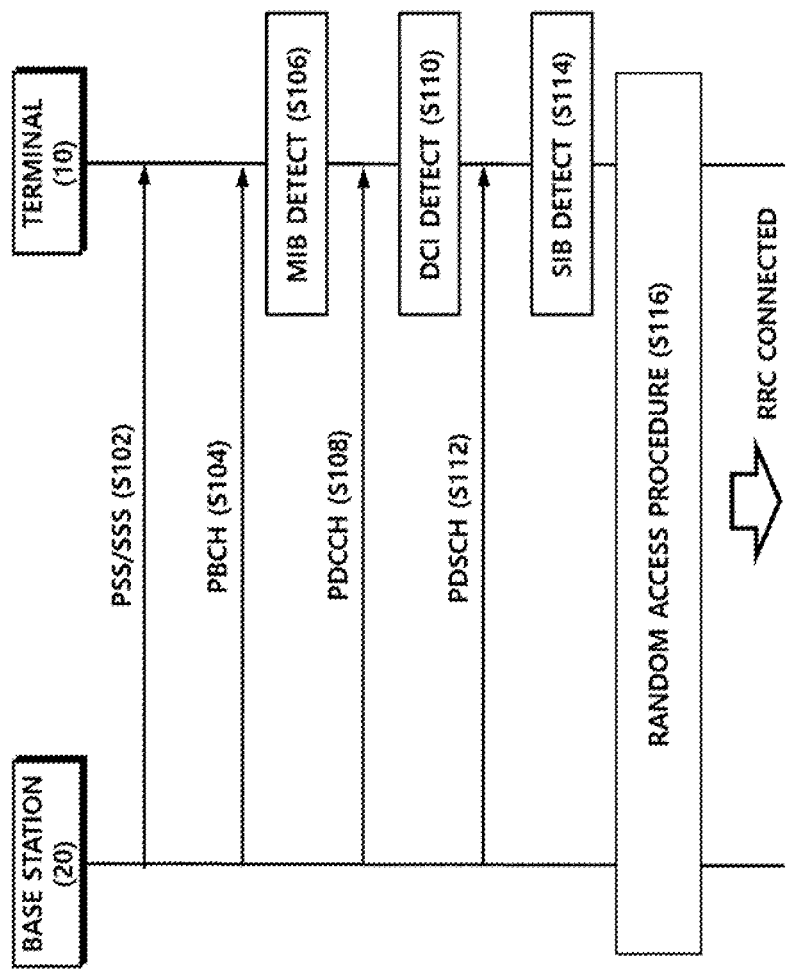
FIG. 1 illustrates an initial stage of a cell access process.

Hereinafter, some embodiments of the present disclosure are described in detail with reference to exemplary drawings. In adding reference numerals to configuration elements of each drawing, it should be noted that elements with identical configurations have identical numerals as much as possible even though the elements appear in a different drawing. Further, in describing the present disclosure, when it is determined that a specific description of a related known configuration or function may obscure the subject matter of the present disclosure, the detailed description thereof is omitted.

In the present specification, an MTC terminal may signify a terminal supporting a low cost (or low complexity), a terminal supporting coverage enhancement, or the like. In the present specification, an MTC terminal may signify a terminal supporting a low cost (or low complexity), a terminal supporting coverage enhancement, and the like. Alternatively, in the present specification, an MTC terminal may signify a terminal that is defined as a specific category for supporting a low cost (or low complexity) and/or coverage enhancement.

In other words, in the present specification, an MTC terminal may signify a newly defined 3GPP Release-13 low cost (or low complexity) UE category/type that performs an LTE-based MTC related operation. Alternatively, in the present specification, an MTC terminal may signify a UE category/type defined under the existing 3GPP Release-12, which supports an improved coverage relative to the existing LTE coverage or supports low power consumption, or a newly defined Release-13 low cost (or low complexity) UE category/type.

A wireless communication system in the present disclosure is widely placed in order to provide various communication services such as a voice, packet data, and the like. A wireless communication system includes a user terminal (User Equipment, UE) and a base station (BS or eNB). The user terminal in the present specification has a comprehensive concept signifying a terminal in wireless communication and may be required to be interpreted as a concept including all of a user equipment (UE) in WCDMA, LTE, HSPA, etc., in addition to a mobile station (MS), a user terminal (UT), a subscriber station (SS), and a wireless device, etc., in GSM.

A base station or a cell generally indicates a point (station) at which communication with a user terminal is performed, and may be referred to as other terms such as a node-B, an evolved node-B (eNB), a sector, a site, a base transceiver system (BTS), an access point, a relay node, a remote radio head (RRH), a radio unit (RU), a small cell, and the like.

That is, in the present specification, a base station or a cell is required to be interpreted to have a comprehensive meaning indicating some of the area or a function, which is covered by a base station controller (BSC) in a CDMA, a node-B of WCDMA, an eNB or a sector (site) in LTE, etc., and has a comprehensive meaning including all the various coverage areas of a mega cell, a macro cell, a micro cell, a pico cell, a femto cell, a relay node, an RRH, an RU, a small cell communication range, and the like.

Various cells described above have base stations that control each of the cells, and the base stations may be interpreted in two ways: i) with respect to a wireless area, the base station may be a device itself that provides a mega cell, a macro cell, a micro cell, a pico cell, a femto cell, or a small cell, or ii) the base station may indicate the wireless area itself. In reference numeral i), all interacting devices are indicated as base stations such that devices providing a predetermined wireless area are controlled by an identical entity, or the wireless area is configured through a coordinated work. According to a configuration scheme of a wireless area, an eNB, an RRH, an antenna, an RU, an LPN, a point, a transmitting and receiving point, a transmitting point, a receiving point, etc., may be an embodiment of a base station. In reference numeral ii), a wireless area itself, in which a signal is received or transmitted at a user terminal's point of view or in a situation of a neighboring base station, may be indicated as a base station.

Therefore, a mega cell, a macro cell, a micro cell, a pico cell, a femto cell, a small cell, an RRH, an antenna, an RU, a low power node (LPN), a point, an eNB, a transmitting and receiving point, a transmitting point, and a receiving point are commonly referred to as a base station.

In the present specification, a user terminal and a base station are two subjects of transmission and reception, that are used for implementing a technology or a technical idea described in the present specification, are used having comprehensive meanings, and are not limited by a specifically designated term or word. A user terminal and a base station are two (uplink or down link) subjects of transmission and reception, that are used for implementing a technology or a technical idea described in the present disclosure, are used having comprehensive meanings, and are not limited by a specifically designated term or word. Here, an uplink (UL) signifies a scheme of transmitting and receiving data to the base station by the user terminal, and a downlink (DL) signifies a scheme of transmitting and receiving data to the user terminal by the base station.

There is no limit in a multiple access technique applied to a wireless communication system. Various multiple access techniques may be used, such as a code division multiple access (CDMA), a time division multiple access (TDMA), a frequency division multiple access (FDMA), an orthogonal frequency division multiple access (OFDMA), OFDM-FDMA, OFDM-TDMA, and OFDM-CDMA. An embodiment of the present disclosure may be applied to resource allocation including an asynchronous wireless communication that evolves to LTE and LTE-Advanced through a GSM, a WCDMA, and a HSPA, and a synchronous wireless communication that evolves to a CDMA, a CDMA-2000, and a UMB. The present disclosure should not be delimited or restricted in a specific wireless communication field, and it may be interpreted to include all technical fields to which the idea of the present disclosure is applicable.

An uplink transmission and a downlink transmission may use a time division duplex (TDD) scheme in which a transmission is performed at different times, or a frequency division duplex (FDD) scheme in which a transmission is performed using different frequencies.

In addition, in a system like LTE and LTE-Advanced systems, an uplink and a downlink are configured to configure a standard with reference to one carrier wave or a pair of carrier waves. An uplink and a downlink transmit control information through a control channel such as a physical downlink control channel (PDCCH), a physical control format indicator channel (PCFICH), a physical hybrid ARQ indicator channel (PHICH), a physical uplink control channel (PUCCH), enhanced physical downlink control channel (EPDCCH) etc., and are configured by a data channel such as a physical downlink shared channel (PDSCH), physical uplink shared channel (PUSCH), etc., so as to transmit data.

Meanwhile, control information may be transmitted using an enhanced PDCCH or extended PDCCH (EPDCCH).

In the present specification, a cell may signify coverage of a signal transmitted from a transmitting and receiving point, a component carrier wave having coverage of a signal transmitted from a transmitting and receiving point (transmission point or transmission/reception point), or a transmitting and receiving point itself.

A wireless communication system to which embodiments are applied may be a coordinated multi-point transmitting and receiving system (CoMP system) in which two or more transmitting and receiving points are coordinated to transmit a signal, a coordinated multi-antenna transmission system, or a coordinated multi-cell communication system. A CoMP system may include two or more multi transmitting and receiving points, and terminals.

Multi transmitting and receiving points may be a base station or a macro cell (hereinafter, referred to as "eNB"), and at least one RRH that is connected to an eNB through an optical cable or an optical fiber so as to be wiredly controlled, has a high transmission power, or has a low transmission power within a macro cell area.

Hereinafter, a downlink signifies a communication from multi transmitting and receiving points to a terminal or a communication path, and an uplink signifies a communication from a terminal to multi transmitting and receiving points or a communication path. In a downlink, a transmitter may be a part of multi transmitting and receiving points and a receiver may be a part of a terminal. In an uplink, a transmitter may be a part of a terminal, and a receiver may be a part of multi transmitting and receiving points.

Hereinafter, a situation in which a signal is transmitted and received through a channel such as a PUCCH, a PUSCH, a PDCCH, an EPDCCH, and a PDSCH may also be indicated as "a PUCCH, a PUSCH, a PDCCH, an EPDCCH, and a PDSCH are transmitted and received."

In addition, hereinafter, an indication of transmitting or receiving a PDCCH or transmitting and receiving a signal through a PDCCH may be used for including the meaning of transmitting or receiving an EPDCCH or transmitting or receiving a signal through an EPDCCH.

That is, a physical downlink control channel indicated hereinafter may signify a PDCCH or an EPDCCH, and is used to include the meaning of both PDCCH and EPDCCH.

Further, for the convenience of description, an EPDCCH that is an embodiment of the present disclosure may be applied to a part in which a PDCCH is described, and an EPDCCH may be applied, as an embodiment of the present disclosure, to a part in which an EPDCCH is described.

Meanwhile, an upper layer signaling (high layer signaling) described hereinafter includes an RRC signaling that transmits RRC information including an RRC parameter.

A base station performs a downlink transmission to terminals. A base station may transmit a physical downlink shared channel (PDSCH) that is a main physical channel for a unicast transmission, downlink control information of scheduling required for receiving the PDSCH, and a physical downlink control channel (PDCCH) for transmitting scheduling approval information for a transmission in an uplink data channel (for example, a physical uplink shared channel (PUSCH)). Hereinafter, transmitting and receiving a signal through each channel will be indicated as transmitting and receiving a corresponding channel.

FIG. 1 illustrates an initial stage of a cell access process.

Referring to FIG. 1, in an initial stage of a cell access process, a terminal 10 receives a primary synchronization signal (PSS) and a secondary synchronization signal (SSS) that are synchronization signals transmitted by a base station 20 at step S102. In an LTE frequency division duplex (FDD), the PSS may be transmitted in a last symbol #n of a first slot of a subframe #5 and a first subframe #0 in a wireless frame (radio frame, for example, 10 ms), and the SSS may be transmitted in a symbol #n-1 before the last symbol #n of the first slot of a subframe #5 and a subframe #0. In an LTE TDD, a PSS/SSS may be transmitted at a different location from that in FDD. When the terminal 10 detects a PSS and SSS, a cell ID and downlink synchronization information may be acquired, and additional synchronization and an existing control channel demodulation may be performed using a cell-specific reference signal (CRS) based on information acquired based on the PSS/SSS.

The terminal 10 receives a signal through a CRS-based PBCH from the base station 20 at step S104. The terminal 10 extracts a master information block (MIB) transmitted through the PBCH at step S106. The MIB may include information indicating a bandwidth of a cell, information indicating a PHICH configuration, and information indicating a system frame number. The terminal 10 may be informed of a resource to which a PDCCH is allocated based on information included in the MIB.

The terminal 10 receives a signal through a CRS-based PDCCH from the base station 20 at step S108. The terminal 10 extracts downlink control information (DCI) transmitted through the PDCCH at step S110. The DCI may be control information on a PDSCH to which a system information block (SIB) is transmitted. The DCI may be transmitted through a common search space.

The terminal 10 receives a signal through a demodulation reference (DM-RS)-based PDSCH from the base station based on a DCI at step S112, and the terminal 10 extracts an SIB transmitted through the PDSCH at step S114.

After, the terminal 10 and the base station 20 may perform a random access procedure at step S116, and the terminal 10 may be in an RRC connected state in an RRC idle state.

Figure 2:
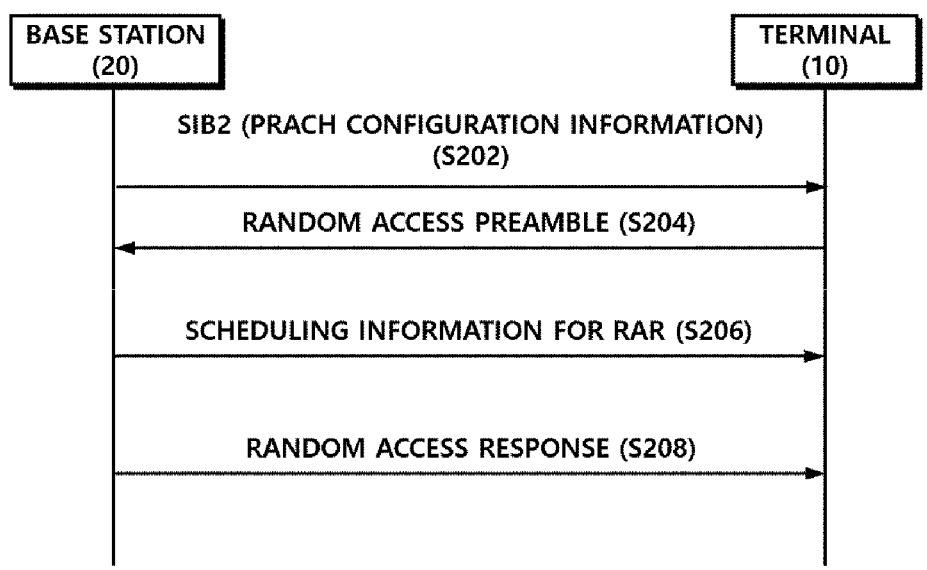
FIG. 2 illustrates a random access process in FIG. 1.

FIG. 2 illustrates, in more detail, step S116 in FIG. 1, which performs a random access procedure.

Referring to FIG. 2, a base station 20 transmits PRACH configuration information to a terminal 10 at step S202. The PRACH configuration information may be included in an SIB2. The PRACH configuration information may include parameters preambleInitialReceivedTargetPower and powerRampingStep that are used when a transmission power pf a PRACH is determined. Detailed descriptions about the parameters preambleInitialReceivedTargetPower and powerRampingStep are provided later.

The terminal 10 determines the transmission power of the PRACH and transmits a random access preamble through the PRACH to the base station 20 at step S204.

The base station 20 receives the random access preamble and transmits, to the terminal 10, scheduling information on a random access response (RAR) through a PDCCH or an EPDCCH at step S206. Downlink control information (DCI) including the scheduling information on the RAR may be scrambled with an RA-RNTI and transmitted through the PDCCH or EPDCCH common search space (CSS).

The base station 20 transmits the RAR through a PDSCH to the terminal 10, and the terminal 10 having received the scheduling information on the RAR receives the RAR using the same at step S208.

Figure 3:
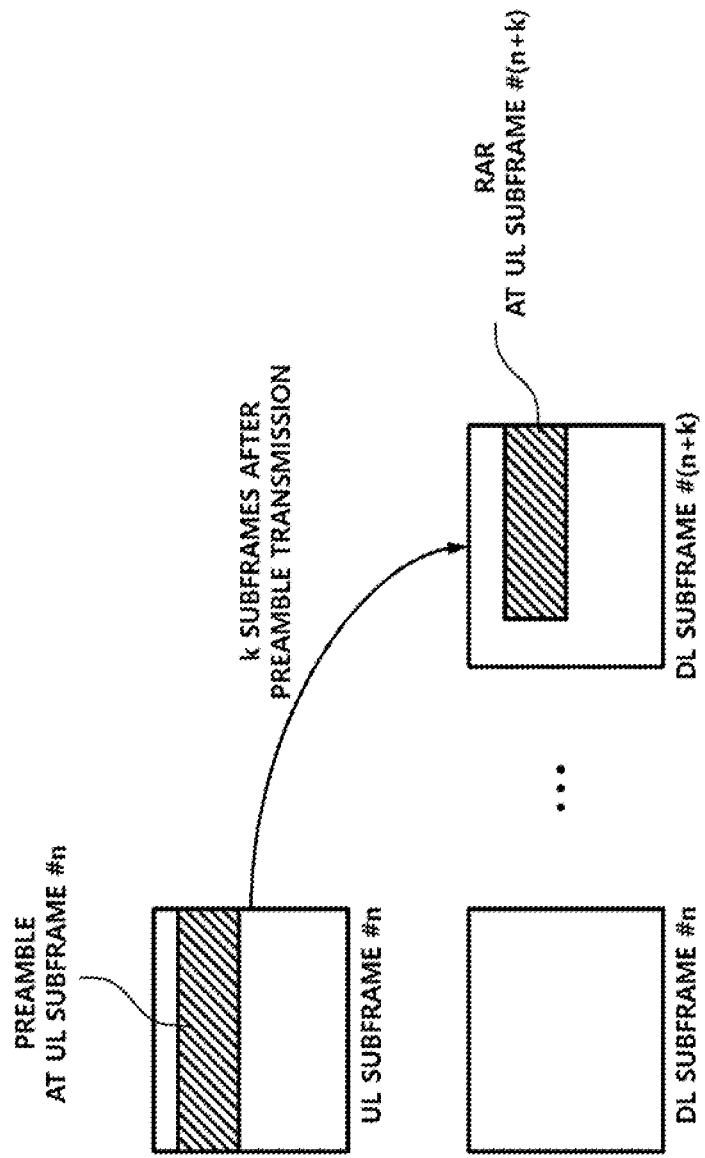
FIG. 3 illustrates a process of transmitting a random access preamble and a random access response, for a normal terminal.

FIG. 3 illustrates a process of a typical terminal for transmitting a random access preamble and a random access response.

Referring to FIG. 3, a terminal 10 transmits a random access preamble through a PRACH in an uplink subframe #n. A base station 20 having received the random access preamble transmits an RAR through a PDSCH in a downlink subframe #(n+k). In this case, the terminal 10 transmits the random access preamble in an uplink subframe (subframe #n), and the base station 20 transmits the RAR in a downlink subframe (subframe #(n+k)). When the terminal 10 fails to transmit a random access preamble (or the terminal 10 fails to receive an RAR), the terminal 10 transmits the random access preamble through the PRACH in a next PRACH transmission subframe.

In step S204 in FIG. 2, a transmission power ($P_{PRACH}$) of a random access preamble of terminal 10 may be determined by the mathematical equation 1 described below.

$$P_{PRACH} = \min\{P_{CMAX,c}(i), \text{PREAMBLE\_RECEIVED\_TARGET\_POWER} + PL_c - 10 \log M_n\}\_[\text{dBm}] \quad [\text{Equation 1}]$$

In Equation 1, $P_{CMAX,c}(i)$ is a maximum transmission power in subframe i of a serving cell c in which a terminal transmits a random access preamble, PREAMBLE_RECEIVED_TARGET_POWER is a reception power of a target preamble generated in an MAC layer, and $PL_c$ is a path loss value measured by the terminal 10. PREAMBLE_RECEIVED_TARGET_POWER may be determined by mathematical equation 2 described below.

PREAMBLE_RECEIVED_TARGET_POWER=
preambleInitialReceivedTargetPower+DELTA_PREAMBLE+(PREAMBLE_TRANSMISSION_COUNTER−1)*powerRampingStep [Equation 2]

In Equation 2, preambleInitialReceivedTargetPower and powerRampingStep are RRC parameters that are values received through an upper layer signaling in step S202 in FIG. 2, DELTA_PREAMBLE is a value determined according to a preamble format like the table in FIG. 4, and PREAMBLE_TRANSMISSION_COUNTER is the number of times of attempting to transmit a random access preamble by a terminal.

Referring to Equations 1 and 2, when the terminal 10 transmits a random access preamble for the first time and a preamble format is zero or one, a transmission power of the random access preamble ($P_{PRACH}$) is min{$P_{CMAX,c}(i)$, PREAMBLE_RECEIVED_TARGET_POWER+$PL_c$}. When the random access preamble transmission fails and the random access preamble is re-transmitted, the transmission power ($P_{PRACH}$) of the random access preamble increases by powerRampingStep.

[LTE-Based Low Cost MTC]

As the LTE network grows, a mobile communication service provider wants to minimize the number of radio access terminals (RAT) in order to reduce the maintenance cost of the network. However, typical GSM/GPRS network-based MTC products have been increasing and an MTC using a low data transmission rate can be provided at low cost. Therefore, in a position of the mobile communication service provider, using an LTE network for transmitting normal data and a GSM/GPRS network for MTC creates a problem of individually operating two RATs, which is an inefficient use of a frequency bandwidth and is a burden on the profits of the mobile communication service provider.

In order to solve this problem, a low cost MTC terminal using a GSM/GPRS network is required to be replaced with an MTC terminal using an LTE network. To this end, various requirements for reducing the cost of an LTE MTC terminal are discussed in the 3GPP RAN WG1 Standardization Meeting. In addition, the Standardization Meeting has been creating documents describing various functions that may be provided to satisfy the requirements.

An example of a main item relating to a change in the physical layer standard that is currently under discussion in 3GPP in order to support the low cost LTE MTC terminal may be a technology such as a narrowband support, a single RF chain, a half-duplex FDD, a long discontinued reception (DRX) technique, and the like. However, the methods that have been considered in order to lower the cost may lower the performance of the MTC terminal compared to the typical LTE terminal.

In addition, since about 20% of the MTC terminals supporting an MTC service like smart metering are installed in a "deep indoor" environment like a basement, the coverage of an LTE MTC terminal should be improved by about 20 dB or so compared to the coverage of a typical LTE terminal for a successful MTC data transmission. Further, in additional consideration of the performance reduction due to the change in the standard, the coverage of the LTE MTC terminal should be improved by at least about 20 dB.

Accordingly, in order to improve coverage while reducing the cost of an LTE MTC terminal, various methods for a robust transmission like a power spectral density (PSD) boosting, a low coding rate, a time domain repetition, etc., have been considered for each physical channel.

The requirements for an LTE-based low cost MTC terminal are as follows.

The data transmission rate should meet, at least, the data transmission rate provided by an enhanced GPRS (EG-PRS)-based MTC terminal, that is, 118.4 kbps for a downlink and 59.2 kbps for an uplink.

The frequency efficiency should be dramatically improved relative to a GSM/EGPRS MTC terminal.

The provided service area should not be smaller than that provided by a GSM/EGPRS MTC terminal.

The amount of power consumption should not be greater than that of a GSM/EGPRS MTC terminal.

A normal LTE terminal and an LTE MTC terminal should be able to be used in the same frequency The typical LTE/SAE network is reused.

Optimization is performed not only in an FDD mode but in a TDD mode.

A low cost LTE MTC terminal should support a limited mobility and a low power consumption module.

In the present disclosure, a low cost MTC terminal that requires coverage improvement due to the performance degradation of transmitting and receiving a wireless channel compared to a normal LTE/LTE-Advanced terminal is referred to as a coverage limited MTC terminal.

[Repeating Random Access Preamble for Coverage Limited MTC Terminal]

In any LTE/LTE-Advanced base station, a random access preamble format may be newly defined or a method of repeatedly transmitting a typical random access preamble format may be considered in order to improve the performance of receiving a random access preamble of a coverage limited MTC terminal.

Figure 5:
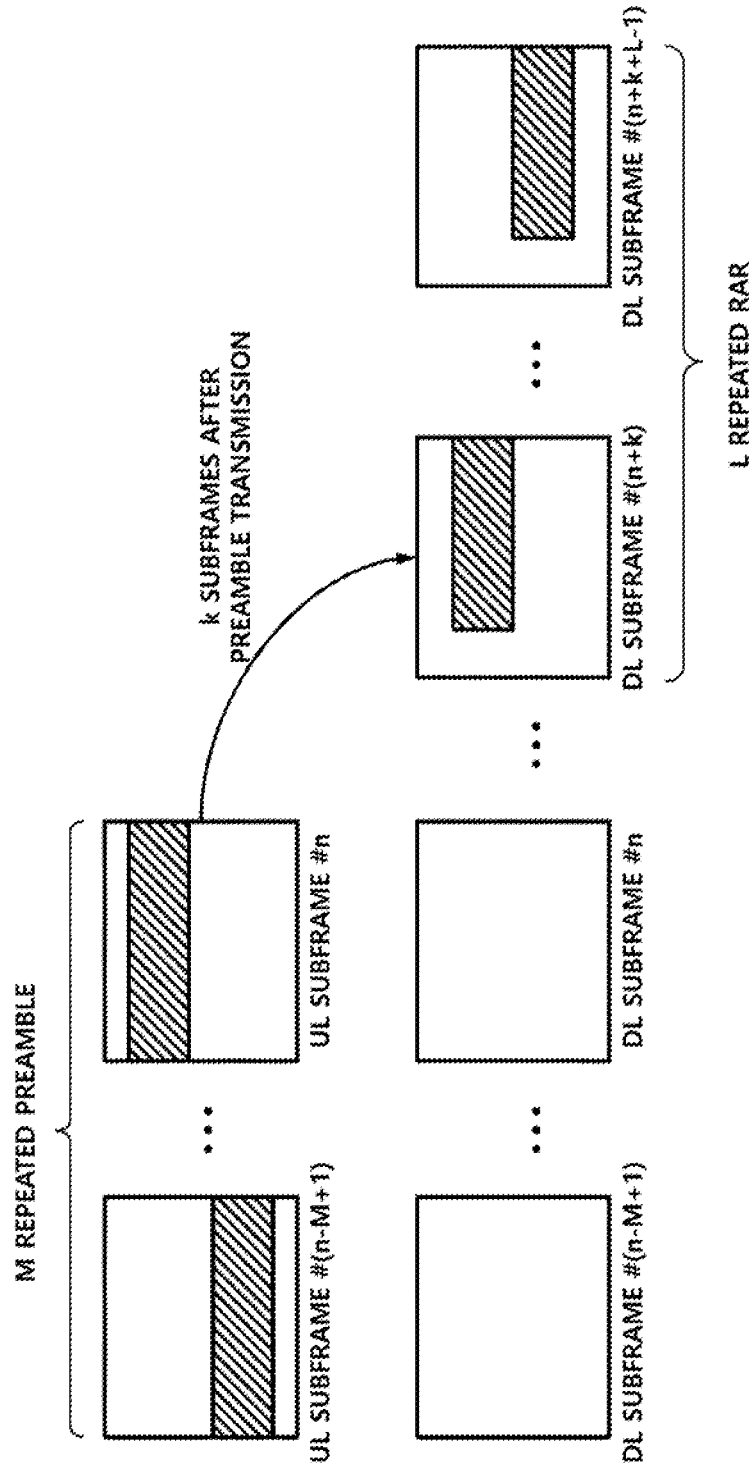
FIG. 5 illustrates a process of repeatedly transmitting a random access preamble and random access response, for an MTC terminal.

FIG. 5 illustrates a process of repeatedly transmitting a random access preamble and random access response, for an MTC terminal.

For example, in the case of a coverage limited MTC terminal, a method of transmitting, repeatedly M times, a preamble generated based on a random access preamble format for a typical LTE/LTE-Advanced terminal like FIG. 4 in M number of uplink subframes (UL subframe #(n−M+1) to UL subframe #n) may be considered. Here, a base station may transmit, repeatedly L times, an RAR to a coverage limited MTC terminal through L number of downlink frames (DL subframe #(n+k) to DL subframe #(n+k+L−1)).

As another example, in the case of a coverage limited MTC terminal, a method may be considered for transmitting a preamble generated based on a new random access preamble format which is defined through M number of uplink frames, in other words, in which the length of a preamble format (the sum of a CP length of a preamble format and a sequence length, i.e., a value of $T_{CP}+T_{SEQ}$, or a length of sequence length, $T_{SEQ}$) has been extended.

In addition, an application of a semi-static scheduling method, that is not a typical dynamic scheduling) method, is considered for an RAR message transmission resource allocation for a corresponding coverage limit MTC terminal in a base station.

Thus, it is necessary to define a method of allocating a PRB for an RAR transmission in one or more downlink subframes in which a corresponding RAR transmission is specifically performed and a corresponding downlink subframe, for an application of the semi-static scheduling with respect to a corresponding RAR. According to a method for transmitting a random access preamble of a terminal in a typical LTE/LTE-Advanced system, a terminal that is to transmit a random access preamble configures and transmits a transmission power of the preamble according to the Equation 1 and Equation 2 of the random access preamble format configured in a corresponding cell. However, when the PRACH repetition method is applied as a method to improve the performance of receiving the preamble of a coverage limit MTC terminal, it is necessary to define a repetition level (e.g., repetition number, M value) configuration method for the corresponding MTC terminal.

Embodiments of the present disclosure suggest a random access preamble repetition level (e.g., repetition number, M value) configuration method for an MTC terminal.

Embodiments of the present disclosure suggest a random access preamble transmission method of any coverage limited MTC terminal. Particularly, when the random access preamble transmission is repeatedly performed through a plurality of uplink subframes as a method for improving the performance of transmitting and receiving the random access preamble of the coverage limited MTC terminal, a measure of determining a corresponding repetition level (or the repetition number) and a transmission power of each random access preamble is suggested.

Figure 6:
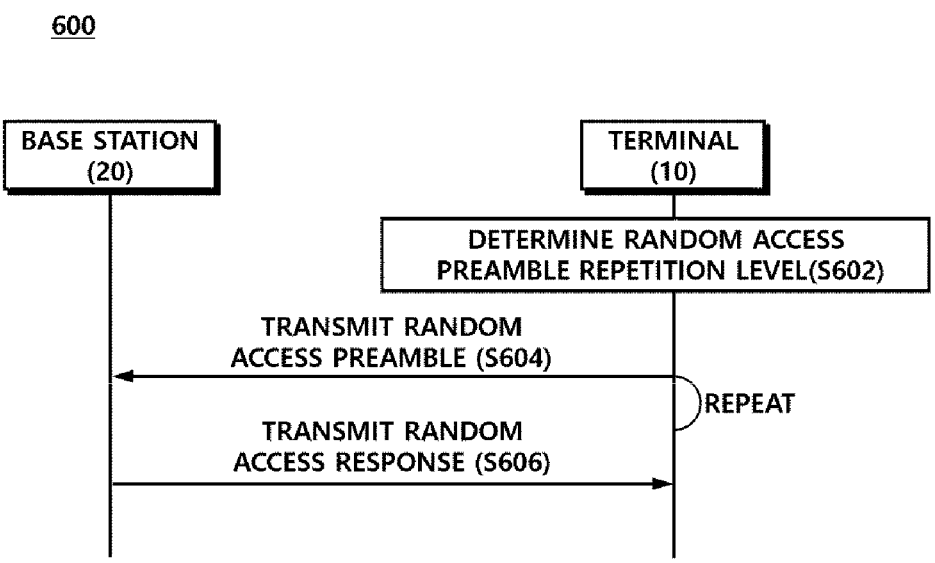
FIG. 6 is a flow diagram illustrating a method of performing a random access according to embodiments of the present disclosure.

FIG. 6 is a flow diagram illustrating a method of performing a random access according to embodiments of the present disclosure.

Referring to FIG. 6, in accordance with embodiments of the present disclosure a method may be provided for performing a random access by a terminal 10. The method may include: determining a preamble repetition level based on at least one parameter among parameters that determine a transmission power of the random access preamble or a coverage level at step S602; repeatedly transmitting, to a base station 20, the random access preamble through a predetermined number of subframes corresponding to the determined preamble repetition level at step S604; and receiving, from the base station 20, a random access response related to the random access preamble, wherein when the random access response is not received from the base station, the random access preamble is repeatedly transmitted to the base station at step S606.

Here, the terminal 10 may perform determining of the preamble repetition level based on at least one parameter among parameters that determine a transmission power of the random access preamble or a coverage level at step S602 before step S604. However, the terminal may repeatedly transmit, to the base station 20, the random access preamble through a predetermined number of subframes corresponding to the preamble repetition level predetermined based on at least one parameter among parameters that determine a transmission power of the random access preamble or a coverage level in step S604 without separately performing step S602.

Here, when a random access response related to the random access preamble is not received by a base station, the terminal 10 may repeat transmitting, to the base station 20, the random access preamble at step S604. In other words, the terminal 10 terminates a random access procedure without necessarily repeating the random access preamble transmission to the base station 20 when a random access response related to the random access preamble is received.

Meanwhile, the preamble repetition level may be determined based on a downlink path loss value ($PL_c$), parameters that determine a transmission power of a random access preamble including a maximum transmission power $P_{CMAX,c}(i)$, a downlink path loss value ($PL_c$), preambleInitialReceivedTargetPower, and a function of DELTA_PREAMBLE.

A coverage level may be determined based on the repetition number of a downlink physical channel or configured by a terminal-specific upper layer signaling.

In addition, when the terminal 10 cannot receive a random access response from the base station 20 and repeats transmitting a random access preamble to the base station 20 at step S604, the terminal 10 may perform a ramping transmission power whenever repeatedly transmitting M (M is a whole number greater than 1) number of random access preambles, which correspond to preamble repetition level n (n is a whole number greater than 1), to the base station 20, and then increase the preamble repetition level, and repeatedly transmit random access preambles to the base station 20 when a predetermined condition is achieved.

Embodiment 1

Figure 7:
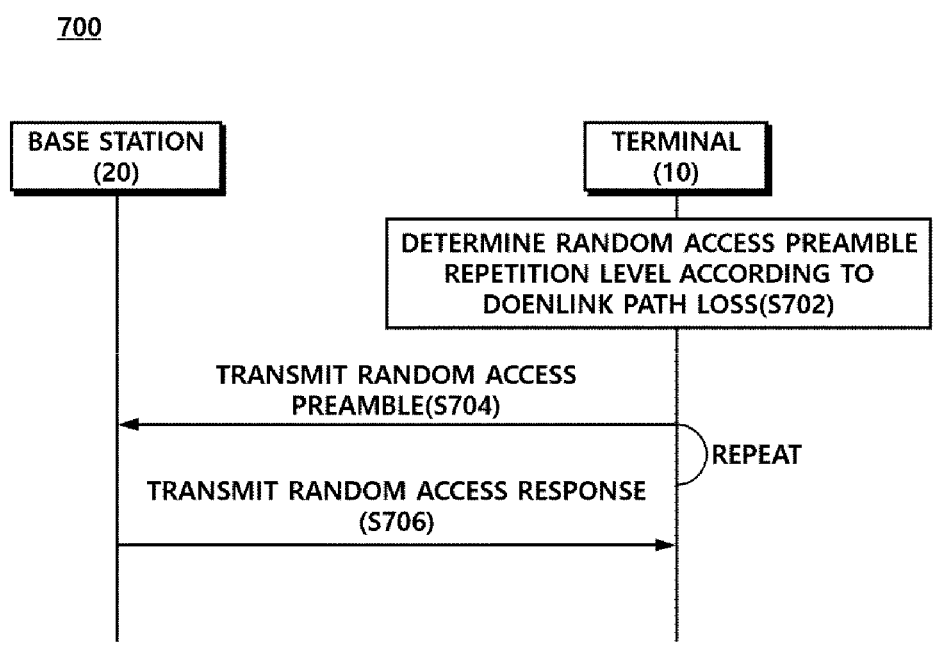
FIG. 7 is a flow diagram illustrating a random access preamble transmission method according to an embodiment of the present disclosure.

FIG. 7 is a flow diagram illustrating a random access preamble transmission method according to an embodiment of the present disclosure.

Referring to FIG. 7, in accordance with an embodiment of the present disclosure, a random access preamble transmission method 700 may be provided. The radon access preamble transmission method 700 may, include: determining a preamble repetition level by a downlink path loss value ($PL_c$) at step S702; repeatedly transmitting, to a base station 20, a random access preamble through a predetermined number of subframes corresponding to the determined preamble repetition level at step S704; and receiving, from the base station 20, a random access response related to the random access preamble at step S706.

Here, when a random access response related to the random access preamble is not received, the terminal 10 may repeat transmitting the random access preamble to the base station 20. In other words, when a random access response related to the random access preamble is received, the terminal 10 terminates a random access procedure without necessarily repeating transmitting the random access preamble to the base station 20 at step S704.

To this end, embodiments of the present disclosure are described i) based on a case where five random access preamble formats defined in a typical LTE/LTE-Advanced system as illustrated in FIG. 4 are repeatedly transmitted and ii) based on a case where the number of the random access preamble repetition levels that are supported by any cell is N as illustrated in the table of FIG. 8.

In FIG. 8, values of corresponding n and $M_n$ (n=1, 2, . . . , N) are any whole number greater than 0. However, the embodiments of the present disclosure are not limited thereto.

As described above, in step S802, an initial random access preamble repetition level n for a coverage limited MTC terminal 10 entering a random access procedure or the repetition number $M_n$ value may be determined based on a downlink path loss value $PL_c$.

As a specific example for this, like FIG. 9, any base station 20 may configure a path loss value for a preamble repetition level selection for an MTC terminal 10 within a corresponding cell or a threshold value of the path loss so as to transmit the same to the terminal through a cell-specific or terminal-specific upper layer signaling, or define a fixed path loss threshold value for each corresponding repetition level and thereby apply the same to the MTC terminal.

Here, the path loss threshold for a corresponding repetition level configuration is a lower limit value, which may be defined to select the repetition level n (provided, n=1, 2, ..., N) when a $PL_c$ value measured in any MTC terminal meets $PM_{c,n-c}<PL_c<PL_{c,n}$. However, defining this as $PL_{c,1} \leq -\infty$, and $PL_{c+n} \leq \infty$ may be available. Alternatively, the threshold for a corresponding repetition level configuration is an upper limit, which selects the repetition level n (provided, n=1, 2, ..., N) when $PL_{c,n-1}<PL_c<PL_{c,n}$ is satisfied, and may define to configure repetition level N in the other cases. However, defining this as $PL_{c,0} \leq -\infty$, and $PL_{c,N} \leq \infty$ may be available.

Embodiment 2

Figure 10:
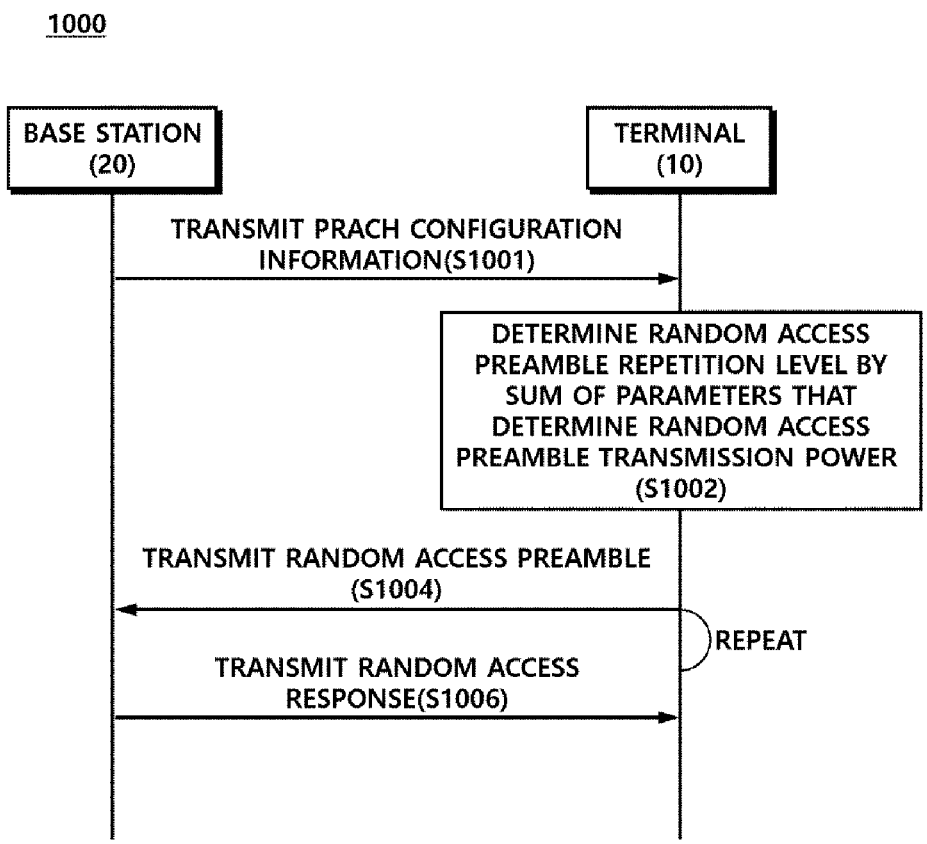
FIG. 10 is a flow diagram illustrating a random access preamble transmission method according to another embodiment of the present disclosure.

FIG. 10 is a flow diagram illustrating a random access preamble transmission method according to another embodiment of the present disclosure.

Referring to FIG. 10, in accordance with another embodiment of the present disclosure, a method 1000 may be provided for transmitting a random access preamble. The random access preamble transmission method 1000 may include: determining a preamble repetition level by a maximum transmission power ($P_{CMAX,c}(i)$) of a terminal, a downlink path loss value ($PL_c$), preambleInitialReceivedTargetPower, and a function of DELTA_PREAMBLE S1002; repeatedly transmitting, to a base station 20, a random access preamble through a predetermined number of subframes corresponding to the determined preamble repetition level at step S1004; and receiving, from the base station 20, a random access response related to the random access preamble at step S1006.

Here, when a random access response related to the random access preamble is not received, the terminal 10 may repeat transmitting the random access preamble to the base station 20 at step S1004.

Meanwhile, the terminal 10 may receive, from the base station 20, PRACH configuration information through an upper layer signaling at step S1001. The PRACH configuration information may include parameters preambleInitialReceivedTargetPower, and powerRampingStep. In addition, the PRACH configuration information may further include a new parameter.

The terminal 10 may determine a random access preamble transmission power. Here, the terminal 10 calculates the random access preamble transmission power using described Equation 1, wherein PREAMBLE_RECEIVED_TARGET_POWER may be calculated using a different equation from mathematical equation 2.

As described above, in step S1002, as another example of determining the repetition level of a preamble according to a downlink path loss, it may be defined to determine the corresponding repetition level using a function of preambleInitialReceivedTargetPower that is a parameter configured by $P_{CMAX,c}(i)$ that is a maximum transmission power of a corresponding MTC terminal 10, a path loss, and an upper layer signaling. In this case, a DELTA_PREAMBLE value that is an offset value according to a preamble format may also be additionally used as a parameter that determines the corresponding repetition level.

As an example for this, when any MTC terminal 10 has transmitted a preamble using a maximum transmission power, it may be defined to configure a minimum repetition level satisfying preambleInitialReceivedTargetPower that is a target reception power value in the base station, using an initial preamble repetition level of a random access preamble transmission to be transmitted from the corresponding terminal.

For example, a preamble repetition level n for a random access preamble transmission may be determined to be n=1 when any i=1, ...,N−1, and mathematical equation 3 and mathematical equation 4 are satisfied.

$$10 \log M_{1+} \geq \text{preambleInitialReceivedTargetPower} + PL_c - P_{CMAX,c}(i) + \text{DELTA\_PREAMBLE} \quad \text{[Equation 3]}$$

$$10 \log M_1 < \text{preambleInitialReceivedTargetPower} + PL_c - P_{CMAX,c}(i) + \text{DELTA\_PREAMBLE} \quad \text{[Equation 4]}$$

In addition, it may be defined to determine a preamble repetition level n for a random access preamble transmission to be n=1 when Equation 5 is satisfied, and to be n=N when Equation 6 is satisfied.

$$10 \log M_1 = <\text{preambleInitialReceivedTargetPower} + PL_c - P_{CMAX,c}(i) + \text{DELTA\_PREAMBLE} \quad \text{[Equation 5]}$$

$$10 \log M_N < \text{preambleIntialReceivedTargetPower} + PL_c - P_{CMAX,c}(i) + \text{DELTA\_PREAMBLE} \quad \text{[Equation 6]}$$

Embodiment 3

Figure 11:
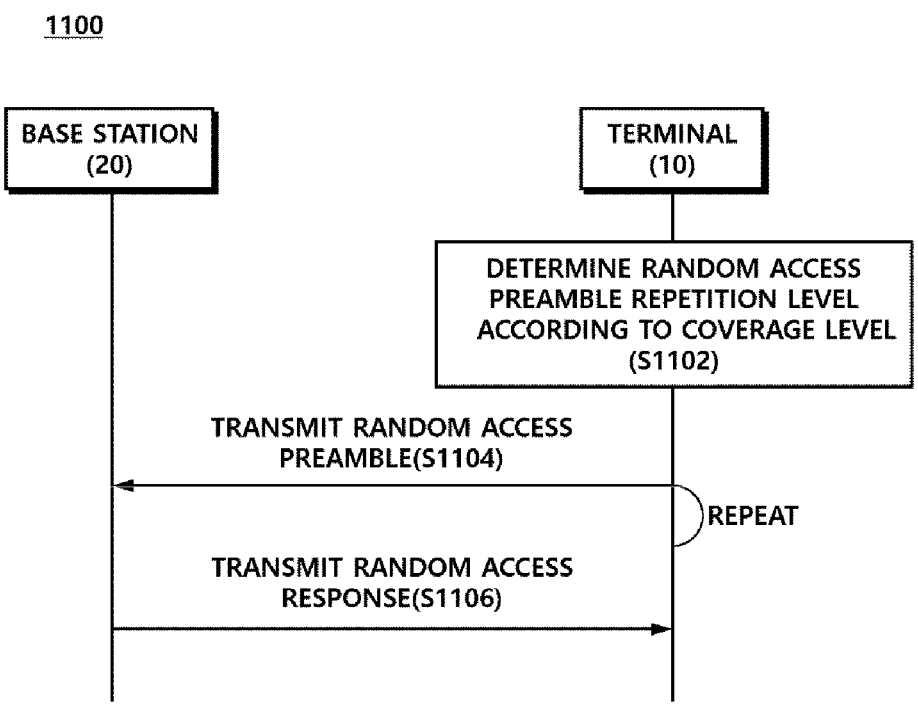
FIG. 11 is a flow diagram illustrating a random access preamble transmission method according to another embodiment of the present disclosure.

FIG. 11 is a flow diagram illustrating a random access preamble transmission method according to another embodiment of the present disclosure.

Referring to FIG. 11, in accordance with another embodiment of the present disclosure, a method 1100 may be provided for transmitting a random access preamble. The random access preamble transmission method 1100 may include: determining a preamble repetition level by a downlink path loss value ($PL_c$) at step S1102; repeatedly transmitting, to a base station 20, a random access preamble through a predetermined number of subframes corresponding to the determined preamble repetition level at step S1104; and receiving, from the base station 20, a random access response related to the random access preamble at step S1106.

Here, when a random access response related to the random access preamble is not received from the base station, the terminal 10 may repeat transmitting of the random access preamble to the base station 20. In other words, when a random access response related to the random access preamble is received, the terminal 10 terminates a random access procedure without necessarily repeating transmitting of the random access preamble to the base station 20 at step S1104.

In step 1102, as another example to determine an initial random access preamble repetition level n for a coverage limited MTC terminal 10 entering a random access procedure or the repetition number $M_n$ value, a random access preamble repetition level n for a coverage limited MTC terminal or the repetition number $M_n$ value may be determined based on the coverage level of the corresponding coverage limited MTC terminal. In the present specification, a coverage level may signify a topology.

In order to support an expanded coverage for a coverage limited MTC terminal, the base station 20 may be required to repeatedly transmit a downlink physical channel, for example, a PBCH, a PDCCH or an EPDCCH, and a PRSCH through a plurality of downlink subframes, which used to be transmitted in a unit of one downlink subframe, and the corresponding MTC terminal may also be required to perform a decoding by combining the PBCH, the PDCCH or the EPDCCH, and the PRSCH which have been received through the corresponding plurality of downlink subframes.

In this case, the corresponding coverage level may be determined based on the repetition number (e.g., the number of combinations of corresponding repeated physical channels for decoding corresponding information, at the point of reception view of the terminal) for a physical channel PBCH or PDSCH, through which corresponding information required for a successful decoding of MIN or SIB information by the corresponding MTC terminal 10, or configured by a terminal-specific upper layer signaling.

Accordingly, when the coverage level of the corresponding MTC terminal is determined, the corresponding coverage level and an initial preamble repetition level for a random access preamble transmission configured by the terminal may be defined to have a 1:1 corresponding relationship as illustrated in FIG. 12, but is not limited thereto.

Meanwhile, when a total number of the coverage levels and a total number of the preamble repetition levels are different, the coverage level and the initial preamble repetition level may be defined to have an x:y corresponding relationship where x and y are whole numbers greater than 0, and x and y are not identical. For example, when a total number of the coverage levels is smaller than a total number of the preamble repetition levels, a preamble repetition level may be different despite the identical coverage level. Here, with respect to the identical coverage level, a mutually different preamble repetition level configuration may use at least one parameter among parameters that determine a transmission power of the described random access preamble or use an upper layer signaled parameter.

For example, as illustrated in FIG. 13, when the total number of the preamble repetition levels is five and the total number of the coverage levels is three, preamble level one or two may be configured using at least one parameter among parameters that determine a transmission power of the random access preamble or using an upper layer signaled parameter, with respect to the identical coverage level, for example, the coverage level $CL_{c,1}$.

Embodiment 4

The above described embodiments of the present disclosure relate to a method of determining an initial preamble repetition level n of a terminal determined, by an upper layer of an MTC terminal, to perform any random access procedure.

In accordance with another embodiment of the present disclosure, when the random access response is not received from a base station and a random access preamble is repeatedly transmitted, i) a ramping of transmission power is performed whenever $M_n$ number of random access preambles, which correspond to preamble repetition level n (n is a whole number greater than 1), are repeatedly transmitted to the base station, and ii) the random access preambles may be repeatedly transmitted to the base station by increasing the preamble repetition level when a predetermined condition is achieved.

For example, a corresponding PREAMBLE_TRANSMISSION_COUNTER is increased by one whenever a random access preamble transmission is performed based on an initial repetition level n determined according to the described embodiments of the present disclosure, and it may be defined to perform the random access preamble transmission by increasing the preamble repetition level by one when the corresponding PREAMBLE_TRANSMISSION_COUNTER has reached a predetermined number, i.e., a threshold value or the transmission power for each random access preamble transmission has reached $P_{CMAX,c}(i)$. However, when the corresponding random access preamble repetition level is a maximum value, the corresponding repetition level may be maintained.

In addition, when a random access procedure is maintained after increasing a preamble repetition level by one like above, it may be defined to reconfigure PREAMBLE_TRANSMISSION_COUNTER of a corresponding terminal to be default value one.

Embodiment 4a

Figure 14:
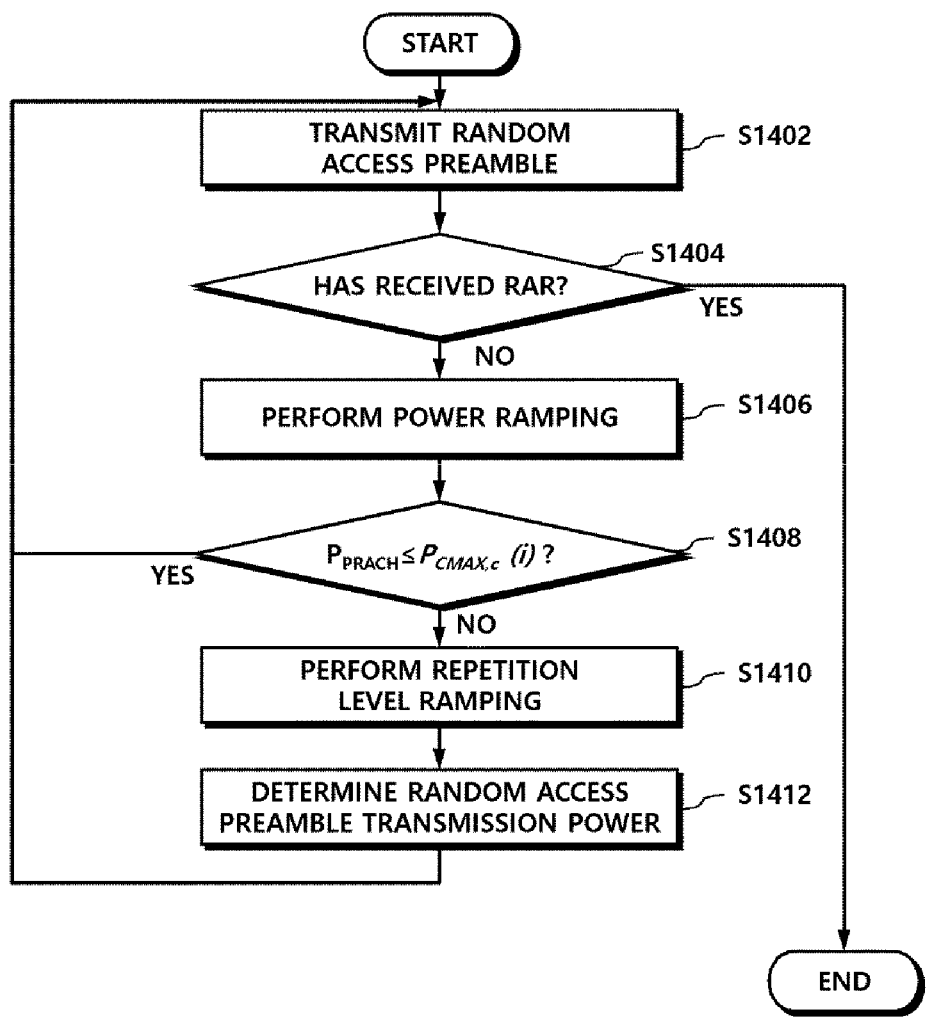
FIG. 14 is a flow diagram describing an embodiment of attempting a preamble repetition level ramping after attempting a power ramping first.

FIG. 14 is a flow diagram for describing attempting a preamble repetition level ramping after attempting a power ramping first in accordance with an embodiment of the present disclosure.

Referring to FIG. 14, a terminal 10 transmits a random access preamble using a transmission power determined based on a preamble repetition level or the repetition number of a preamble at step S1402. Here, an initial preamble repetition level may be determined according to the described embodiments.

The terminal 10 determines whether a random access response (RAR) for a transmitted random access preamble has been received at step S1404.

When a random access response (RAR) for a transmitted random access preamble has not been received, that is, a random access preamble transmission has failed (NO in S1404), a value of the terminal 10 increases a PREAMBLE_TRANSMISSION_COUNTER by one in a configuration equation (for example, mathematical equation 2) of PREAMBLE_RECEIVED_TARGET_POWER so as to perform a power ramping at step S1406. Here, the value of PREAMBLE_RECEIVED_TARGET_POWER increases as much as a value of powerRampingStep or a value of a normalized powerRampingStep, and the random access preamble transmission power ($P_{PRACH}$) thus increases as much as the value of powerRampingStep or the value of the normalized powerRampingStep.

The terminal 10 determines whether the random access preamble transmission power ($P_{PRACH}$), which was determined in the step S1406, is equal to or less than a maximum transmission power ($P_{CMAX,c}(i)$) at step S1408. When the determined random access preamble transmission power ($P_{PRACH}$) is equal to or less than a maximum transmission power ($P_{CMAX,c}(i)$) (YES in S1408), the terminal 10 retransmits the random access preamble at step S1402 using the random access preamble transmission power ($P_{PRACH}$) which was determined in the step S1406.

When the determined random access preamble transmission power ($P_{PRACH}$) is greater than a maximum transmission power ($P_{CMAX,c}(i)$) (NO in S1408), the terminal 10 performs a repetition level ramping by increasing the preamble repetition level to the next level at step S1410, and determines the random access preamble transmission power ($P_{PRACH}$) based on the increased preamble repetition level or the repetition number of the preamble at step S1412. Further, the terminal 10 retransmits the random access preamble at step S1402 using the random access preamble transmission power ($P_{PRACH}$) which was determined in the step S1412.

When the terminal 10 performs a preamble repetition level ramping, the terminal 10 may reconfigure the value of PREAMBLE_TRANSMISSION_COUNTER to be a default value of one, and determine the random access preamble transmission power accordingly. Alternatively, the terminal 10 may determine the random access preamble transmission power while maintaining the value of PREAMBLE_TRANSMISSION_COUNTER. Alternatively, the terminal 10 may increase only the repetition level of the random access preamble transmission power, while maintaining the current transmission power, that is, a maximum transmission power ($P_{CMAX,c}(i)$).

Figure 15:
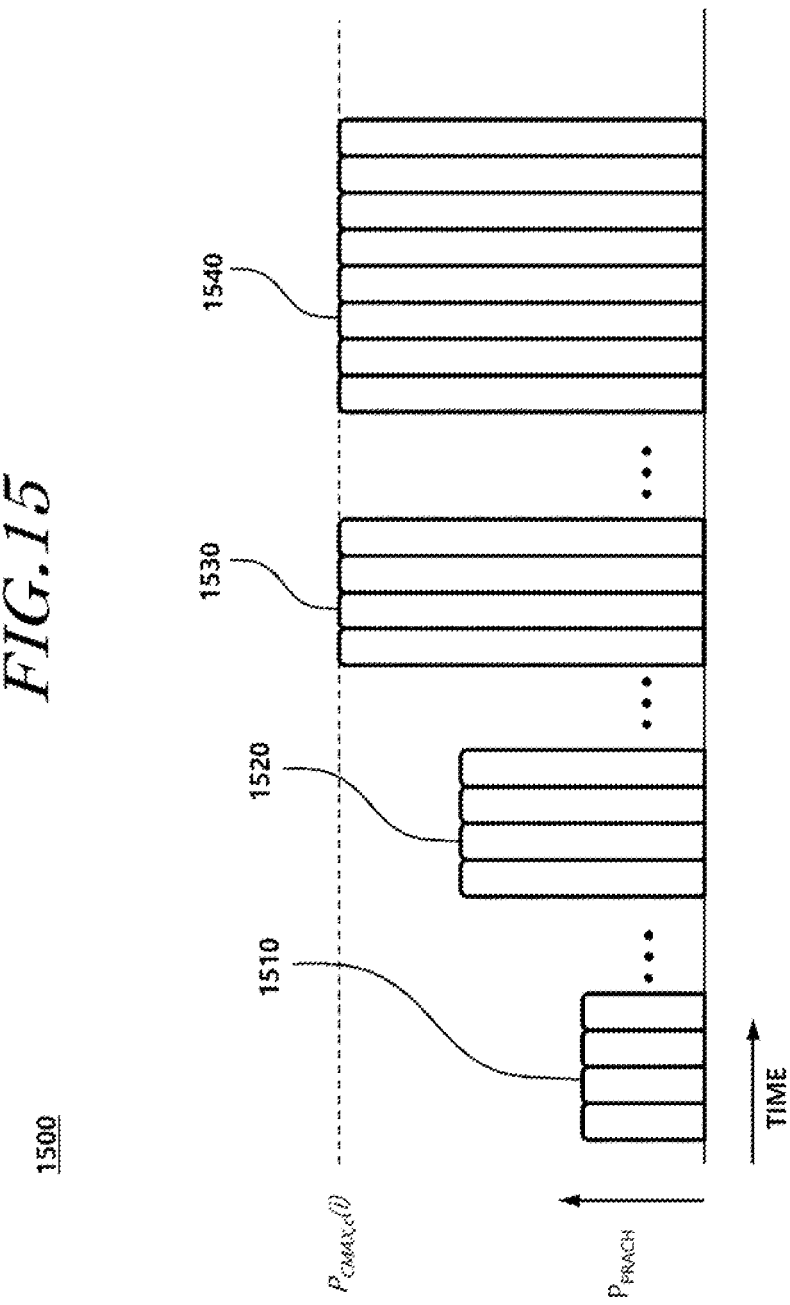
FIG. 15 illustrates an example of changes in a transmission power and number of transmission times of a random access preamble transmission according to time, in an example of FIG. 14.

FIG. 15 illustrates an example of changes in a transmission power and a number of transmission times of a random access preamble transmission according to time, in an example of FIG. 14.

Referring to FIG. 15, the terminal 10 initially sets the repetition number of a preamble as four, and the terminal 10 transmits a random access preamble as shown in a graph 1510. When a random access preamble transmission fails, the terminal 10 performs a power ramping operation and gradationally increases the transmission power of the random access preamble as shown in graphs 1520, 1530. When the random access preamble transmission fails even though the transmission power of the random access preamble has reached a maximum transmission power ($P_{CMAX,c}(i)$), the terminal 10 performs a repetition level ramping and increases the repetition number of the preamble so as to transmit the random access preamble as shown in a graph 1540.

FIG. 15 illustrates that a preamble transmission power is regular when the repetition level ramping is performed, but the present disclosure is not limited thereto. For another example, the terminal 10 may newly determine the transmission power of a random access preamble based on a modified repetition number of a preamble when performing a repetition level ramping.

Embodiment 4b

Figure 16:
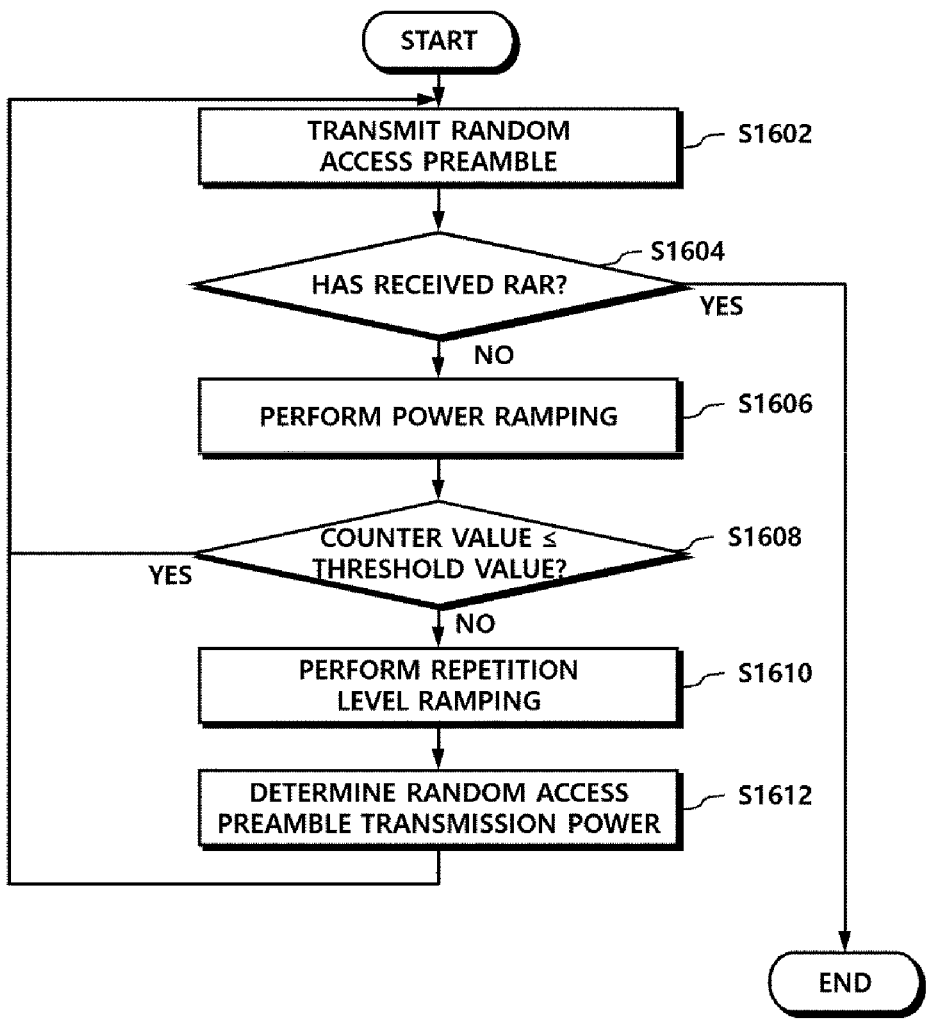
FIG. 16 is a flow diagram describing another embodiment of attempting a preamble repetition level ramping after attempting a power ramping first.

FIG. 16 is a flow diagram describing attempting a preamble repetition level ramping after attempting a power ramping first in accordance another embodiment of the present disclosure.

Referring to FIG. 16, step S1602 and step S1604, step S1606, step S1610, and step S1612 in another embodiment of attempting a preamble repetition level ramping after attempting a power ramping first are substantially the same as step S1402 and step S1404, step S1406, step S1410, and step S1412 in an embodiment of attempting a preamble repetition level ramping after attempting a power ramping first.

In step 1608, the terminal 10 determines whether PREAMBLE_TRANSMISSION_COUNTER (counter value in FIG. 16) is equal to or less than a threshold value in step S1606.

When PREAMBLE_TRANSMISSION_COUNTER is equal to or less than a threshold value (YES in S1606), the terminal 10 retransmits the random access preamble using the random access preamble transmission power ($P_{PRACH}$) determined in step S1606.

When PREAMBLE_TRANSMISSION_COUNTER is greater than a threshold value (NO in S1608), the terminal 10 increases a preamble repetition level to the next level and performs a repetition level ramping S1610.

Figure 17:
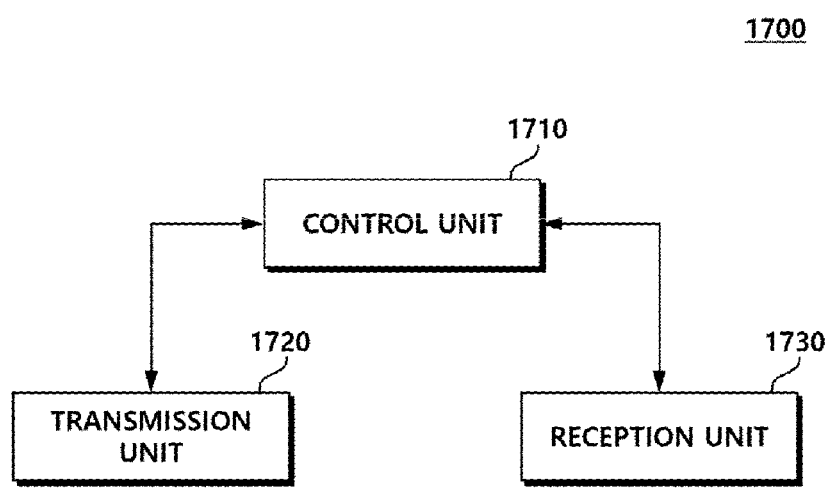
FIG. 17 is a block diagram illustrating a configuration of a base station according to an embodiment of the present disclosure.

FIG. 17 is a block diagram illustrating a configuration of a base station according to an embodiment of the present disclosure.

Referring to FIG. 17, a base station 1700 includes a control unit 1710, a transmission unit 1720, and a reception unit 1730.

The control unit 1710 controls a general operation of the base station, with respect to determining a corresponding preamble level (or repetition number) and each preamble transmission power when a random access preamble transmission is repeatedly performed through a plurality of uplink subframes, as a method for improving a transmitting and receiving performance of the random access preamble of a coverage limited MTC terminal necessary to perform the present disclosure described above.

The transmission unit 1720 and the reception unit 1730 are used for transmitting and receiving, with the terminal, a signal, message, and data necessary to perform the present disclosure described above.

The reception unit 1730 may repeatedly receive, from the base station, a random access preamble through a predetermined number of subframes corresponding to a preamble repetition level determined according to at least one parameter among parameters that determine a transmission power of the random access preamble or a coverage level.

In addition, the transmission unit 1720 may transmit, from the base station, a random access response related to the random access preamble. Here, when the transmission unit 1720 has not transmitted the random access response from the base station, the reception unit 1730 may repeat transmitting the random access preamble to the base station 1700.

Figure 18:
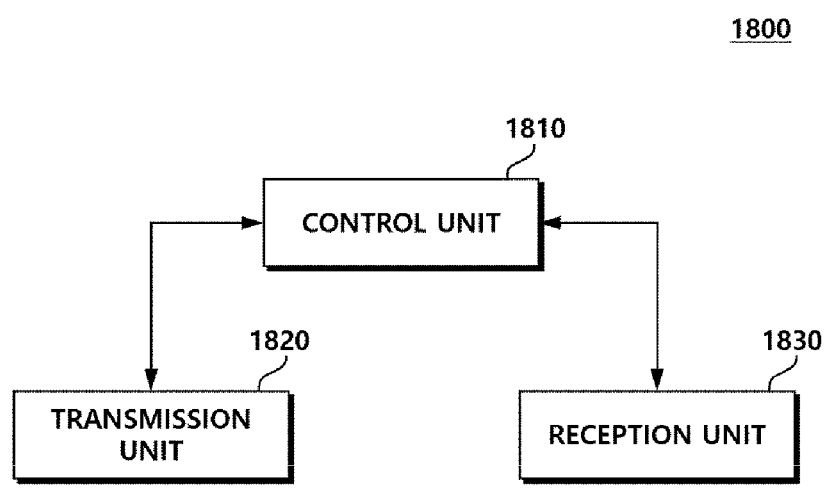
FIG. 18 is a block diagram illustrating a configuration of a terminal according to an embodiment of the present disclosure.

FIG. 18 is a block diagram illustrating a configuration of a terminal according to an embodiment of the present disclosure.

Referring to FIG. 18, a user terminal 1800 includes a reception unit 1830, a control unit 1810, and a transmission unit 1820.

The reception unit 1830 receives, from a base station, downlink control information, data, and a message through a corresponding channel.

The control unit 1810 controls a general operation of the terminal, with respect to determining a corresponding preamble level (or repetition number) and each preamble transmission power when a random access preamble transmission is repeatedly performed through a plurality of uplink subframes, as a method for improving a transmitting and receiving performance of the random access preamble of a coverage limited MTC terminal necessary to perform the present disclosure described above.

The transmission unit 1820 transmits, to the base station, uplink control information, data, and a message through a corresponding channel.

The transmission unit 1820 may repeatedly transmits, to the base station, a random access preamble through a predetermined number of subframes corresponding to a preamble repetition level determined according to at least one parameter among parameters that determine a transmission power of the random access preamble or a coverage level.

In addition, the reception unit 1830 may receive, from the base station, a random access response related to the random access preamble. Here, when the reception unit 1830 has not received the random access response from the base station, the transmission unit 1820 may repeat transmitting the random access preamble to the base station 1800.

Meanwhile, a preamble repetition level may be determined based on a downlink path loss value ($PL_c$) as illustrated in FIG. 7. Furthermore, the preamble repetition level may be determined based on i) a maximum transmission power ($P_{CMAX,c}(i)$), a downlink path loss value ($PL_c$), preambleInitialReceivedTargetPower and ii) a function of DELTA_PREAMBLE, as illustrated in FIG. 10.

In addition, as FIG. 11 illustrates, a coverage level may be determined by the repetition number of a downlink physical channel or a terminal-specific upper layer signaling.

Further, as FIG. 14 to FIG. 16 illustrate, when the random access response is not received from a base station and a random access preamble is repeatedly transmitted, i) a ramping of transmission power is performed whenever number of random access preambles, which correspond to preamble repetition level n (n is a whole number greater than 1), are repeatedly transmitted to the base station, and ii) the random access preambles may be repeatedly transmitted to the base station 1700 by increasing the preamble repetition level when a predetermined condition is achieved.

Here, a particular condition may be of a case where the PREAMBLE_TRANSMISSION_COUNTER, used for determining the transmission power of a random access preamble, reaches a predetermined number by increasing the PREAMBLE_TRANSMISSION_COUNTER by one, or the transmission power for each random access preamble transmission has reached $P_{CMAX,c}(i)$. Meanwhile, a random access preamble may be repeatedly transmitted to the base station 1700 by increasing a preamble repetition level by one.

According to described embodiments of the present disclosure, a transmitting and receiving performance of a random access preamble of a coverage limited terminal may be improved by repeatedly transmitting and receiving the random access preamble of the coverage limited terminal.

The present disclosure has been described with reference to exemplary drawings, but the present disclosure is not limited thereto. For example, described embodiments may be variously combined.

Hereinabove, a method for transmitting and receiving a random access preamble and a method for determining a random access preamble transmission power according to embodiments of the present disclosure are described, according to embodiments, respectively.

Hereinafter, a method for setting a random access preamble transmission power according to another embodiment will be described. Each described embodiment and embodiments to be described below may be performed as individual embodiments or performed by being combined.

According to a random access preamble transmitting method of a terminal in a typical LTE/LTE-Advanced system, the terminal that is to transmit a random access preamble configures (e.g., sets) a preamble transmission power according to the Equations (1) and (2) of a random access preamble format configured in a corresponding cell and transmits the same. However, when the PRACH repetition transmission measure is applied as a method to improve a preamble receiving performance of a coverage limited MTC terminal, it is necessary to newly define a configuration measure of a random access preamble transmission power accordingly.

The present disclosure suggests a random access preamble transmission power configuration method for an MTC terminal. Particularly, when a random access preamble of any MTC terminal is defined to be repeatedly transmitted, random access preamble transmission power configuration methods corresponding to repetition number M values are suggested, respectively.

Embodiments of the present disclosure suggest a random access preamble transmission method of any coverage limited MTC terminal. Particularly, when a random access preamble transmission is repeatedly performed through a plurality of uplink subframes, as a method of improving a transmitting and receiving performance of the random access preamble of the coverage limited MTC terminal, a corresponding repetition level (or repetition number) and a method for determining each random access preamble transmission power are suggested.

To this end, the present disclosure will be described i) based on a case where five random access preamble formats defined in a typical LTE/LTE-Advanced system are repeatedly transmitted and ii) based on a case where the number of random access preamble repetition level that is supported by any cell is N like the table in FIG. 8

In FIG. 8, values of corresponding n and $M_n$ (n=1, 2, . . . , N) are any whole number value. However, the embodiments of the present disclosure are not limited thereto.

For example, referring to FIG. 19, repetition level n and repetition number $M_n$ value depending thereon may be defined as a $2^{(n-1)}$ form.

As described above, when a plurality of repetition levels for any coverage limited MTC terminal are defined, a transmission power configuration for each random access preamble transmission of the corresponding MTC terminal may be different according to a repetition number $M_n$ value depending on the corresponding repetition level n value.

The present disclosure suggests a method of controlling a random access preamble transmission power for a coverage limited MTC terminal by adding, as a parameter, a repetition number $M_n$ value depending on a random access preamble selected for the corresponding MTC terminal, in the described Equation 1 used for determining the random access preamble transmission power of a physical layer of a conventional LTE/LTE-Advanced terminal, or Equation 2 used for determining PREAMBLE_RECEIVED_TARGET_POWER of a MAC layer.

Embodiment 5

Random Access Preamble Transmission Power Control Through Physical Layer

In the present embodiment, in Equations 1 and 2 used for configuring a random access preamble transmission power of a normal terminal, Equation 1 may be modified and used in consideration of a case where a random access preamble is repeatedly transmitted and Equation 2 may be used without modification.

Figure 20:
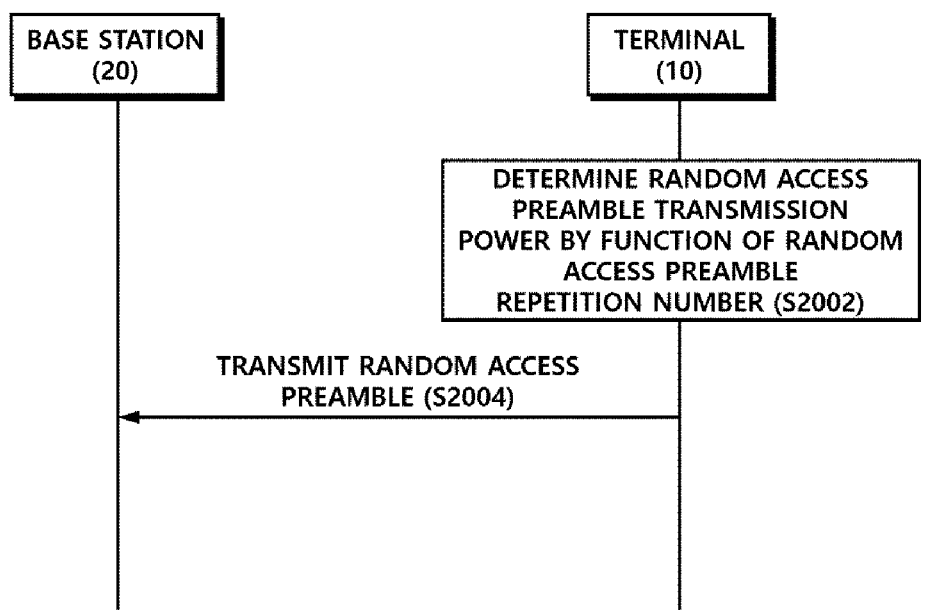
FIG. 20 is a flow diagram illustrating a random access preamble transmission power control method according to an embodiment of the present disclosure.

FIG. 20 is a flow diagram illustrating a random access preamble transmission power control method according to an embodiment of the present disclosure.

Referring to FIG. 20, when a random access preamble transmission is configured to repeatedly transmit a random access preamble $M_n$ times through $M_n$ number of uplink subframes, a terminal 10 determines a random access preamble transmission power by a function of the random access preamble repetition number $M_n$ at step S2002. For example, the transmission power of the random access preamble may be determined by Equation 7 below.

$$P_{PRACH}=\min\{P_{CMAX,c}(i), \text{PREAMBLE\_RECEIVED\_TARGET\_POWER}+PL_c-10\log M_n\}\_[\text{dBm}] \quad \text{[Equation 7]}$$

In Equation 7, $P_{CMAX,c}(i)$ is a maximum transmission power in subframe i of serving cell c in which a terminal transmits a random access preamble, $PL_c$ is a downlink path loss value measured by the terminal 10, and $M_n$ is a random access preamble repetition number. PREAMBLE_RECEIVED_TARGET_POWER may be determined like the described mathematical equation 2. When PREAMBLE_RECEIVED_TARGET_POWER is calculated using mathematical equation 2, a parameter PREAMBLE_TRANSMISSION_COUNTER that indicates the number of times to attempt to transmit the random access preamble by the terminal may count, as one time, an attempt to repeatedly transmit a random access preamble $M_n$ times, $M_n$ being a random access preamble repetition number.

When the $M_n$ value is defined as a $2^{(n-1)}$ form like the table in FIG. 19, Equation 7 may be indicated like mathematical equation 8.

$$P_{PRACH}=\min\{P_{CMAX,c}(i), \text{PREAMBLE\_RECEIVED\_TARGET\_POWER}+PL_c-3*(n-1)\} \text{ [dBm]} \quad \text{[Equation 8]}$$

The terminal 10 transmits, to the base station 20, a random access preamble through a PRACH using determined transmission power of the random access preamble at step S2004.

The Equation 7 is presented as an example, and various equations in which a repetition level n of a random access preamble or a random access preamble repetition number $M_n$ is included as a parameter may be used.

Embodiment 6

Random Access Preamble Transmission Power Control Through Upper Layer

In the present embodiment, in Equations 1 and 2 used for configuring a random access preamble transmission power of a normal terminal, Equation 1 may be used without modification and Equation 2 may be modified and used in consideration of a case where a random access preamble is repeatedly transmitted.

Figure 21:
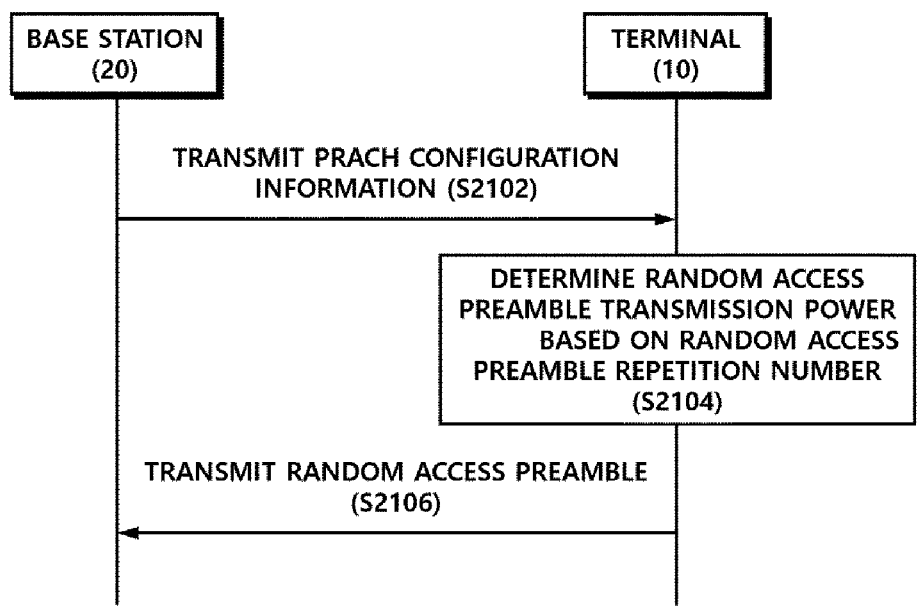
FIG. 21 is a flow diagram illustrating a random access preamble transmission power control method according to another embodiment of the present disclosure.

FIG. 21 is a flow diagram illustrating a random access preamble transmission power control method according to another embodiment of the present disclosure.

Referring to FIG. 21, a terminal 10 receives, from a base station 20, PRACH configuration information through an upper layer signaling at step S2102. The PRACH configuration information may include parameters preambleInitialReceivedTargetPower and powerRampingStep. Alternatively, the PRACH configuration information may further include anew parameter.

The terminal 10 determines a random access preamble transmission power based on a random access preamble repetition number at step S2104. Here, the terminal 10 calculates the random access preamble transmission power using the described Equation 1, wherein PREAMBLE\_RECEIVED\_TARGET\_POWER may be calculated using a different equation from Equation 2.

For example, PREAMBLE\_RECEIVED\_TARGET\_POWER may be determined like Equation 9 described below.

PREAMBLE\_RECEIVED\_TARGET\_POWER=
preambleInitialReceivedTargetPower+DELTA\_PREAMBLE+DELTA\_PREAMBLE REPETITION+(PREAMBLE\_TRANSMISSION\_COUNTER-1)*powerRampingStep   [Equation 9]

In Equation 9, preambleInitialReceivedTargetPower and powerRampingStep are RRC parameters that are received through an upper layer signaling in step S2102, DELTA\_PREAMBLE is a value determined by a preamble format like the table in FIG. 4, and PREAMBLE\_TRANSMISSION\_COUNTER is the number of times to attempt to transmit a random access preamble by the terminal. PREAMBLE\_TRANSMISSION\_COUNTER may count, as one time, an attempt to repeatedly transmit a random access preamble $M_n$ times, $M_n$ being a random access preamble repetition number.

Meanwhile, DELTA\_PREAMBLE\_REPETITION may be determined by the table in FIG. 22. Referring to FIG. 22, DELTA\_PREAMBLE\_REPETITION may be determined according to a random access preamble repetition level. Alternatively, DELTA\_PREAMBLE\_REPETITION may also be determined according to a random access preamble repetition number.

According to the present example, PREAMBLE\_RECEIVED\_TARGET\_POWER may be determined based on a random access preamble repetition level or a random access preamble repetition number, and also a preamble transmission power $P_{PRACH}$ may be thus determined based on a random access preamble repetition level or a random access preamble repetition number.

For another example, PREAMBLE\_RECEIVED\_TARGET\_POWER may be determined like Equation 10 described below.

PREAMBLE\_RECEIVED\_TARGET\_POWER=
preambleInitialReceivedTargetPower+DELTA\_PREAMBLE+a*$M_n$+(PREAMBLE\_TRANSMISSION\_COUNTER-1)*powerRampingStep   [Equation 10]

In Equation 10, preambleInitialReceivedTargetPower and powerRampingStep are RRC parameters that are received through an upper layer signaling in step S2102, DELTA\_PREAMBLE is a value determined by a preamble format like the table in FIG. 4, and PREAMBLE\_TRANSMISSION\_COUNTER is the number of times to attempt to transmit a random access preamble by the terminal. PREAMBLE\_TRANSMISSION\_COUNTER may count, as one time, an attempt to repeatedly transmit a random access preamble $M_n$ times, $M_n$ being a random access preamble repetition number. In addition, $M_n$ is a random access preamble repetition number, and "a" is a proportional constant that may be preconfigured, e.g., through an upper layer signaling, or a value indicated by the base station. For example, "a" may be configured as a=−3, or configured by other mistakes.

In Equation 10, it may be possible to use random access preamble repetition level n instead of random access preamble repetition number $M_n$.

For another example, PREAMBLE\_RECEIVED\_TARGET\_POWER may be determined like Equation 2.

Here, preambleInitialReceivedTargetPower is a parameter used in Equation 2. The parameter preambleInitialReceivedTargetPower may be defined as an individual value according to a random access preamble repetition level or a random access preamble repetition number. For example, parameter preambleInitialReceivedTargetPower may be defined like the table in FIG. 23. The base station 20 may define, using the table in FIG. 23, an individual value with respect to preambleInitialReceivedTargetPower for each random access preamble repetition level or random access preamble repetition number, and transmit the individual value to the terminal 10 through a cell-specific or terminal-specific RRC signaling. The terminal 10 may receive parameter preambleInitialReceivedTargetPower defined by the base station 20 in step S902, and calculate PREAMBLE\_RECEIVED\_TARGET\_POWER using the same in step S2104.

Alternatively, it may be possible to define a preambleInitialReceivedTargetPower value according to a random access preamble repetition level or a random access preamble repetition number to be implicitly determined.

For another example, PREAMBLE\_RECEIVED\_TARGET\_POWER may be determined like the described mathematical equation 2.

Here, powerRampingStep is a parameter used in Equation 2. The parameter powerRampingStep may be defined as an individual value according to a random access preamble repetition level or a random access preamble repetition number. For example, the parameter powerRampingStep may be defined like the table in FIG. 24. The base station 20 may define, using the table in FIG. 24, an individual value with respect to powerRampingStep for each random access preamble repetition level or random access preamble repetition number, and transmit the individual value to the terminal 10 through a cell-specific or terminal-specific RRC signaling. The terminal 10 may receive a parameter power-RampingStep defined by the base station 20 in step S2102, and calculate PREAMBLE_RECEIVED_TARGET_POWER using the same in step S2104.

A powerRampingStep value received through an upper layer signaling is a value determined without considering a random access preamble repetition level or a random access preamble repetition number, and a normalized value may be applied as a random access preamble repetition level or a function of random access preamble repetition number when the parameter powerRampingStep is applied in Equation 2. For example, a powerRampingStep value received through an upper layer signaling may be adjusted so as to be inversely proportional to a random access preamble repetition level or a random access preamble repetition number.

As described, in step S2104, PREAMBLE_RECEIVED_TARGET_POWER may be determined based on a random access preamble repetition level or a random access preamble repetition number, and also a preamble transmission power $P_{PRACH}$ may be thus determined based on a random access preamble repetition level or a random access preamble repetition number.

The terminal 10 may transmit a random access preamble at step S2106 using the preamble transmission power $P_{PRACH}$ which was determined in the step S2104.

Meanwhile, when the terminal 10 fails a preamble repetition level n-based random access preamble transmission, that is, the terminal 10 fails to receive an RAR after the preamble repetition level n-based random access preamble transmission, the terminal 10 may attempt a repetition level ramping after preferentially attempting a power ramping, or attempt a power ramping after preferentially attempting a repetition level ramping. Here, the power ramping signifies to increase power to the next level, and the repetition level ramping signifies to increase the repetition level n to n+1.

Figure 25:
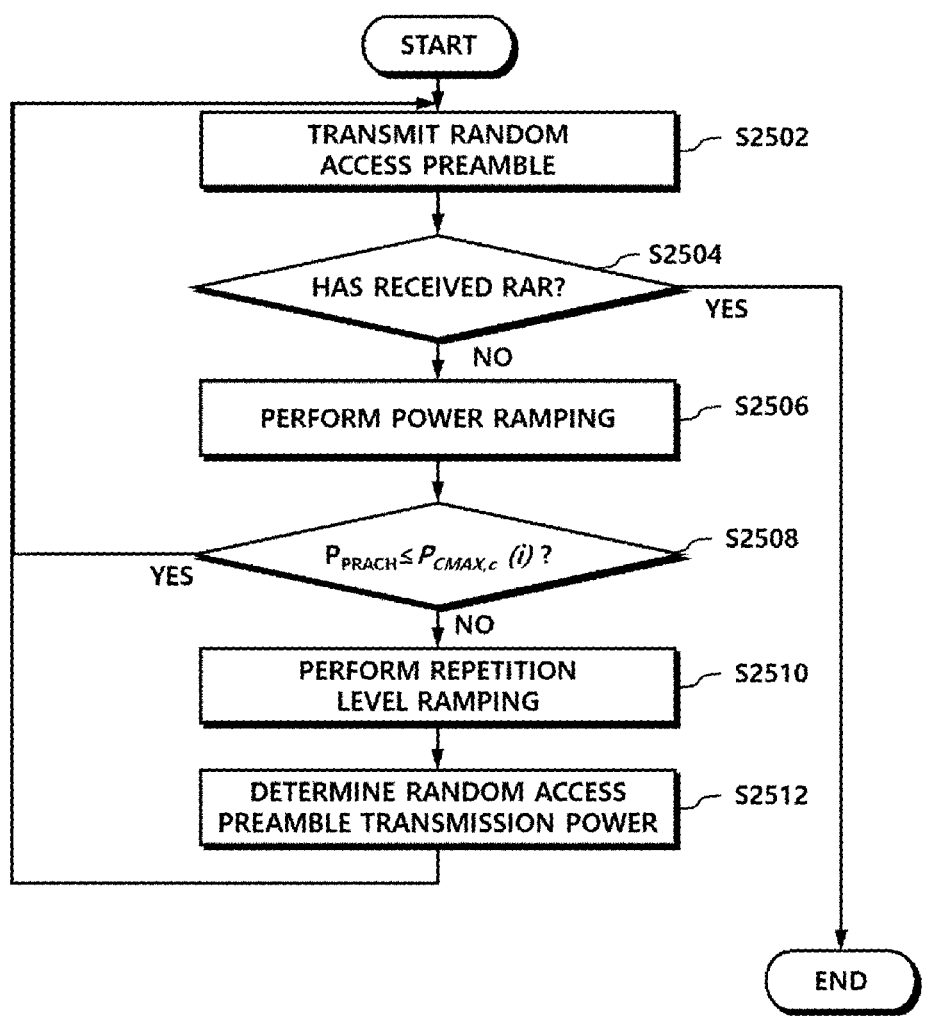
FIG. 25 is a flow diagram illustrating an example of a random access preamble transmission power control method in a case where a random access preamble transmission fails.

FIG. 25 is a flow diagram describing attempting a repetition level ramping after attempting a power ramping first in accordance with an embodiment of the present invention.

Referring to FIG. 25 again, the terminal 10 transmits a random access preamble using a transmission power determined based on a preamble repetition level or a preamble repetition number at step S2502.

The terminal 10 determines whether an RAR for the transmitted random access preamble has been received or not at step S2504.

When the RAR for the transmitted random access preamble has not been received, that is a case where the random access preamble transmission has failed (NO in S2504), the terminal 10 increases a PREAMBLE_TRANSMISSION_COUNTER value by one in a configuration equation (for example, Equations 2, 9, or 10) of PREAMBLE_RECEIVED_TARGET_POWER so as to perform a power ramping operation at step S2506. Here, the value of PREAMBLE_RECEIVED_TARGET_POWER increases as much as a value of powerRampingStep or a value of a normalized powerRampingStep, and the random access preamble transmission power ($P_{PRACH}$) thus increases as much as the value of powerRampingStep or the value of the normalized powerRampingStep.

The terminal 10 determines whether the random access preamble transmission power ($P_{PRACH}$) determined in the step S2506 is equal to or less than a maximum transmission power ($P_{CMAX,c}(i)$) at step S2508. When the determined random access preamble transmission power ($P_{PRACH}$) is equal to or less than a maximum transmission power ($P_{CMAX,c}(i)$) (YES in S2508), the terminal 10 retransmits the random access preamble at step S2502 using the random access preamble transmission power ($P_{PRACH}$) that was determined in the step S2506.

When the determined random access preamble transmission power ($P_{PRACH}$) is greater than a maximum transmission power ($P_{CMAX,c}(i)$) (NO in S2508), the terminal 10 performs a repetition level ramping by increasing the preamble repetition level to the next level at step S2510, and determines the random access preamble transmission power ($P_{PRACH}$) based on the increased preamble repetition level or the repetition number of the preamble at step S2512. Further, the terminal 10 retransmits the random access preamble at step S2502 using the random access preamble transmission power ($P_{PRACH}$) that was determined in step S2512.

When the terminal 10 performs a preamble repetition level ramping operation, the terminal 10 may i) reconfigure the value of PREAMBLE_TRANSMISSION_COUNTER to be a default value of one and ii) determine the random access preamble transmission power accordingly. Alternatively, the terminal 10 may determine the random access preamble transmission power while maintaining the value of PREAMBLE_TRANSMISSION_COUNTER. Alternatively, the terminal 10 may increase only the repetition level of the random access preamble transmission power, while maintaining the current transmission power, that is, a maximum transmission power ($P_{CMAX,c}(i)$).

Figure 26:
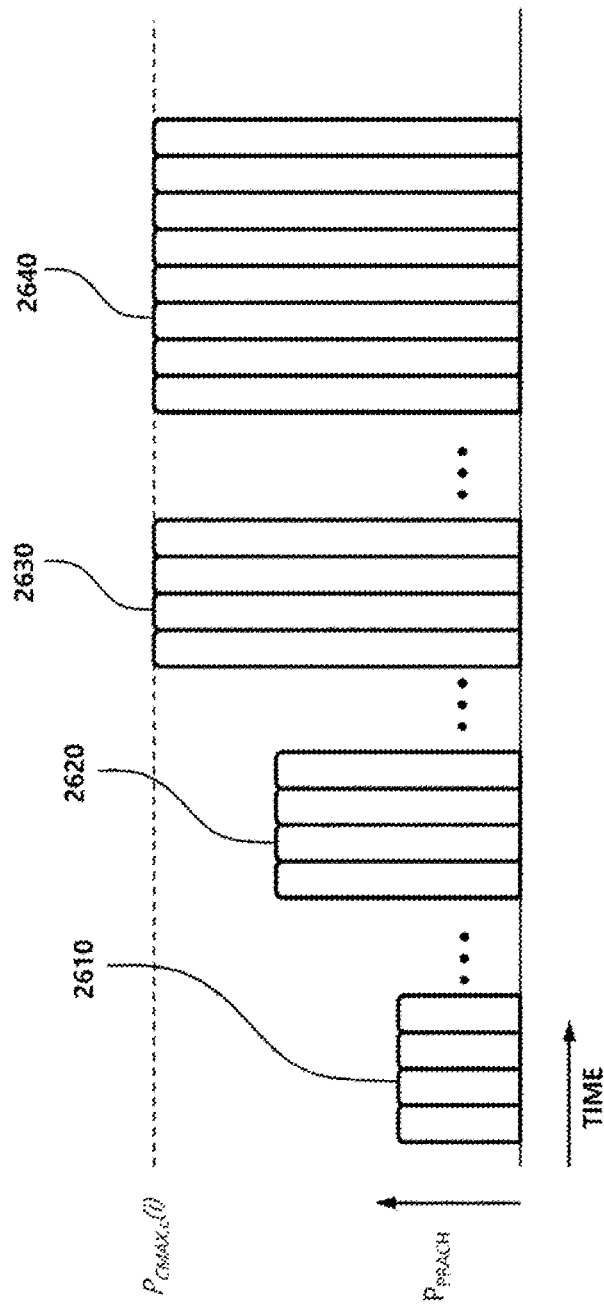
FIG. 26 illustrates an example of changes in a transmission power and a number of transmission times of a random access preamble transmission according to time, in an example of FIG. 25.

FIG. 26 illustrates an example of changes in a transmission power and number of transmission times of a random access preamble transmission according to time, in an example of FIG. 25

Referring to FIG. 26, the terminal 10 initially sets the repetition number of a preamble to be four and transmits a random access preamble as shown in a graph 2610. When a random access preamble transmission fails, the terminal 10 performs a power ramping operation and gradationally increases the transmission power of the random access preamble as shown in graphs 2620, 2630. When the random access preamble transmission fails even though the transmission power of the random access preamble has reached a maximum transmission power ($P_{CMAX,c}(i)$), the terminal 10 performs a repetition level ramping and increases the repetition number of the preamble so as to transmit the random access preamble as shown in a graph 2640.

FIG. 26 illustrates that a preamble transmission power is regular when the repetition level ramping is performed, but the present disclosure is not limited thereto. For another example, the terminal 10 may newly determine the transmission power of a random access preamble based on a modified repetition number of a preamble when performing a repetition level ramping.

Figure 27:
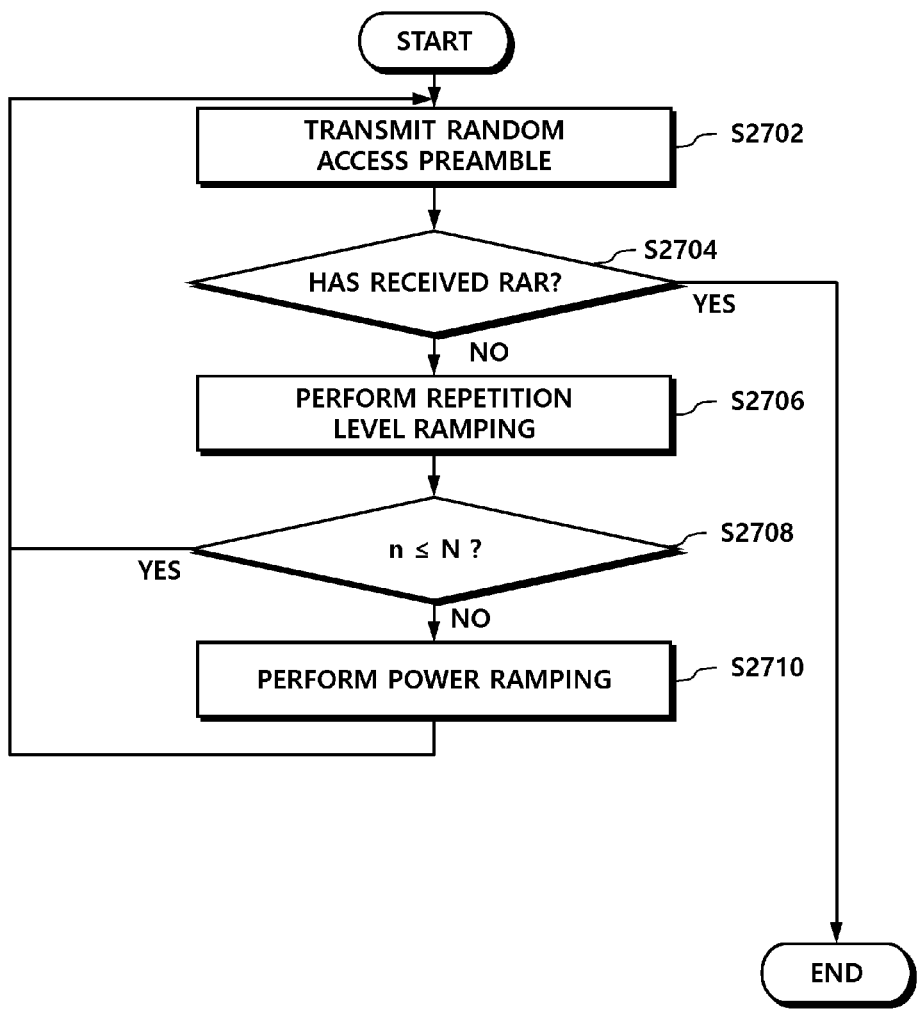
FIG. 27 is a flow diagram illustrating another example of a random access preamble transmission power control method in a case where a random access preamble transmission fails.

FIG. 27 is a flow diagram describing attempting a power ramping after attempting a repetition level ramping first in accordance with an embodiment of the present disclosure.

Referring to FIG. 27, the terminal 10 transmits a random access preamble using a transmission power determined based on a preamble repetition level or a preamble repetition number at step S2702.

The terminal 10 may determine whether an RAR for the transmitted random access preamble has been received or not at step S2704.

When the RAR for the transmitted random access preamble has not been received, that is a case where the random access preamble transmission has failed (NO in S2704), the terminal 10 increases a preamble repetition level to the next level so as to perform a repetition level ramping at step S2706.

When the terminal 10 performs the repetition level ramping, the terminal 10 may maintain the random access preamble transmission power of the time before the repetition level ramping being performed.

Alternatively, the terminal 10 may newly determine a random access preamble transmission power based on a random access preamble repetition level or a random access preamble repetition number. Here, the terminal 10 may reconfigure the value of PREAMBLE_TRANSMISSION_COUNTER to be a default value of one, or determine the random access preamble transmission power while maintaining the value of PREAMBLE_TRANSMISSION_COUNTER The terminal 10 determines whether a preamble repetition level is equal to or less than a maximum repetition level N or not at step S2708. When the preamble repetition level is equal to or less than a maximum repetition level N (YES in S2708), the terminal retransmits the random access preamble at step S2702.

When the preamble repetition level is greater than a maximum repetition level N (NO in S2708), the terminal 10 increases the PREAMBLE_TRANSMISSION_COUNTER value by one in a configuration equation (for example, Equations 2, 9, or 10) of PREAMBLE_RECEIVED_TARGET_POWER so as to perform a power ramping operation at step S2710. In addition, the terminal 10 retransmits the random access preamble using the modified preamble transmission power at step S2702.

When the terminal 10 performs a power ramping operation, the terminal 10 may maintain a preamble repetition level to be the current value, that is, the maximum repetition level N. Here, the value of PREAMBLE_RECEIVED_TARGET_POWER increases as much as a value of powerRampingStep or a value of a normalized powerRampingStep, and the random access preamble transmission power ($P_{PRACH}$) may be thus increased as much as the value of powerRampingStep or the value of the normalized powerRampingStep.

Alternatively, the terminal 10 may reconfigure a preamble repetition level to be the default value. In this case, the terminal 10 may determine a preamble transmission power based on the reconfigured preamble repetition level and increased value of PREAMBLE_TRANSMISSION_COUNTER FIG. 28 illustrates an example of changes in a transmission power and number of transmission times of a random access preamble according to time, in an example of FIG. 27.

Figure 28:
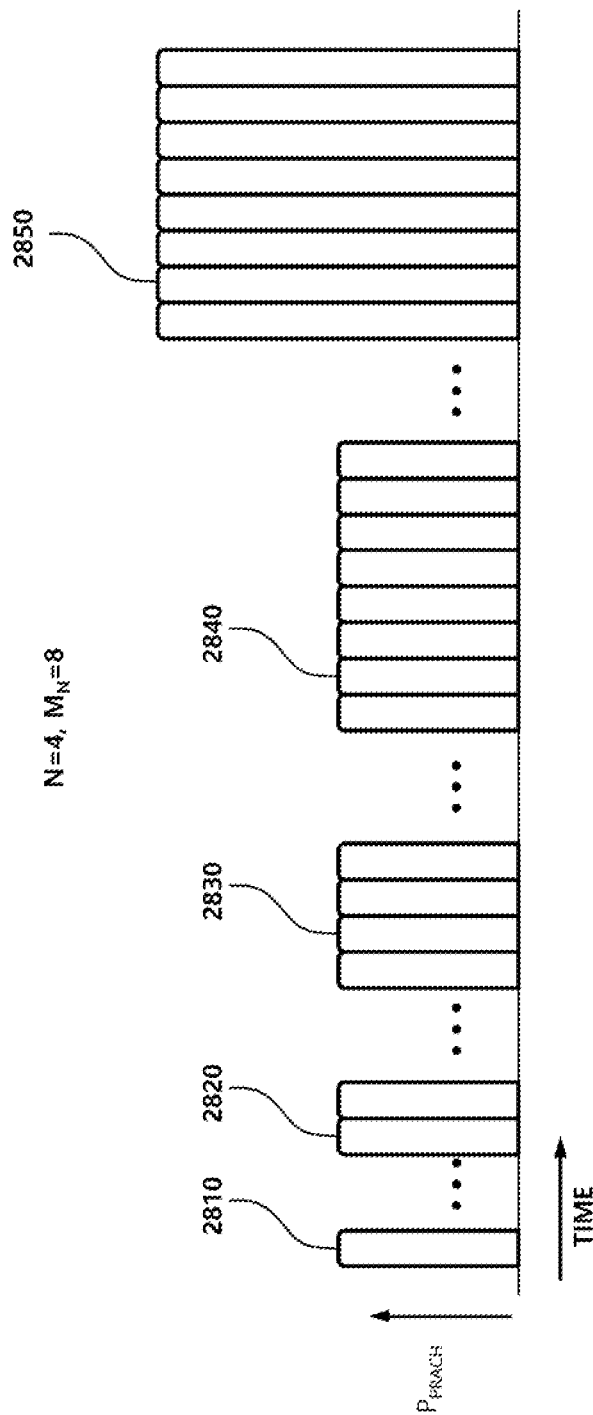
FIG. 28 illustrates an example of changes in a transmission power and number of transmission times of a random access preamble according to time, in an example of FIG. 27.

In the example of FIG. 28, when the repetition level of a random access preamble is n, the repetition number of the random access preamble is determined to be $M_n=2^{(n-1)}$, and a maximum repetition level is assumed to be four. The terminal 10 initially sets a preamble repetition level to be one (preamble repetition number, one), so as to transmit the random access preamble as shown in a graph 2810. When the random access preamble transmission fails, the terminal 10 gradationally increases the preamble repetition level by performing a repetition level ramping as shown in graphs 2820, 2830, and 2840. When the random access preamble transmission fails even though the preamble repetition level reaches a maximum repetition level of four (preamble repetition number eight), the terminal 10 increases the transmission power of the random access preamble by performing a power ramping, so as to transmit the random access preamble as shown in a graph 2850.

FIG. 28 illustrates that a preamble transmission power is regular when the repetition level ramping is performed, but the present disclosure is not limited thereto. For another example, the terminal 10 may newly determine the transmission power of a random access preamble based on a modified repetition number of a preamble when performing a repetition level ramping.

Figure 29:
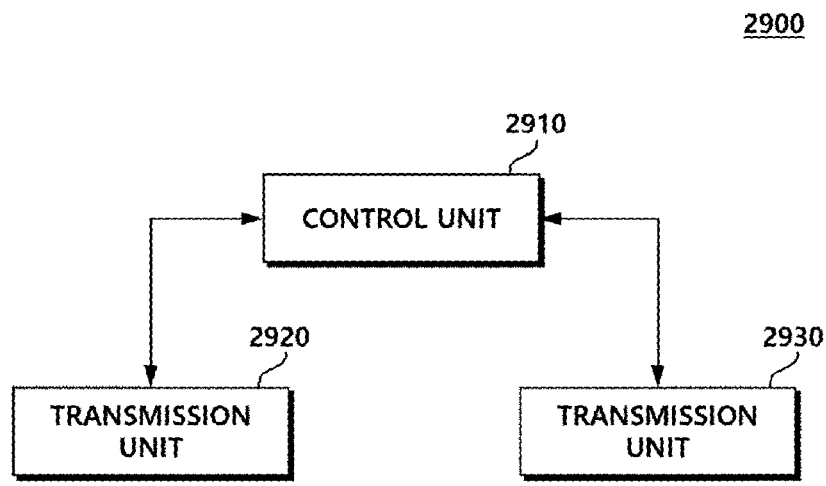
FIG. 29 is a block diagram illustrating a configuration of a terminal according to another embodiment of the present disclosure.

FIG. 29 is a block diagram illustrating a configuration of a terminal according to another embodiment of the present disclosure.

Referring to FIG. 29, a terminal 2900 includes a control unit 2910, a transmission unit 2920, and a reception unit 2930.

The control unit 2910 controls a general operation of the terminal 2900. The control unit 2910 may control a general operation for performing embodiments of the present disclosure.

The transmission unit 2920 and the reception unit 2930 may transmit and receive, with a base station, a signal, message, or data necessary for performing embodiments of the present disclosure.

The reception unit 2930 may receive PRACH configuration information through an upper layer signaling. The PRACH configuration information may include parameters preambleInitialReceivedTargetPower and powerRampingStep.

The control unit 2910 may determine a random access preamble repetition level or number. In addition, the control unit 2910 may determine a transmission power of a random access preamble based on the determined random access preamble repetition level or number.

For example, the calculation equation of a transmission power of a random access preamble may include a repetition transmission level or number of a random access preamble as a parameter, or include a value determined based on a repetition transmission level or number of a random access preamble as a parameter.

Alternatively, PRACH configuration information may include a parameter determined by a base station based on a repetition transmission level or number of a random access preamble, and the control unit 2910 may determine the transmission power of a random access preamble using the parameter determined based on the repetition transmission level or number of the random access preamble. The parameter determined by the base station based on the repetition transmission level or number of the random access preamble may be parameters preambleInitialReceivedTargetPower and powerRampingStep, or a new parameter (for example, DELTA_PREAMBLE_REPETITION).

Alternatively, a parameter included in PRACH configuration information may be normalized according to a repetition transmission level or number, and the control unit 2910 may determine a transmission power of a random access preamble using the normalized parameter.

Meanwhile, when a random access preamble transmission has failed, that is, an RAR reception has failed after the random access preamble transmission, the control unit 2910 may attempt a repetition level ramping after preferentially attempting a power ramping, or attempt a power ramping after attempting a repetition level ramping.

In a case where a power ramping is preferentially performed, the control unit 2910 may attempt a random access preamble transmission while gradationally increasing a random access preamble transmission power until reaching a maximum transmission power ($P_{CMAX,c}(i)$) first, and when the random access preamble transmission fails even at the maximum transmission power, the control unit 2910 may attempt a random access preamble transmission while gradationally increasing a preamble repetition level.

When a repetition level ramping is preferentially performed, the control unit 2910 may attempt a random access preamble transmission while gradationally increasing a preamble repetition level until reaching a maximum repetition level N first, and when the preamble transmission has failed even at the maximum repetition level, the control unit 2910 may attempt a random access preamble transmission while gradationally increasing a random access preamble transmission power.

The transmission unit 2920 may transmit a random access preamble using the random access preamble transmission power determined by the control unit 2910, and the reception unit 2930 may receive, from a base station, a random access response (RAR) for the random access preamble.

Figure 30:
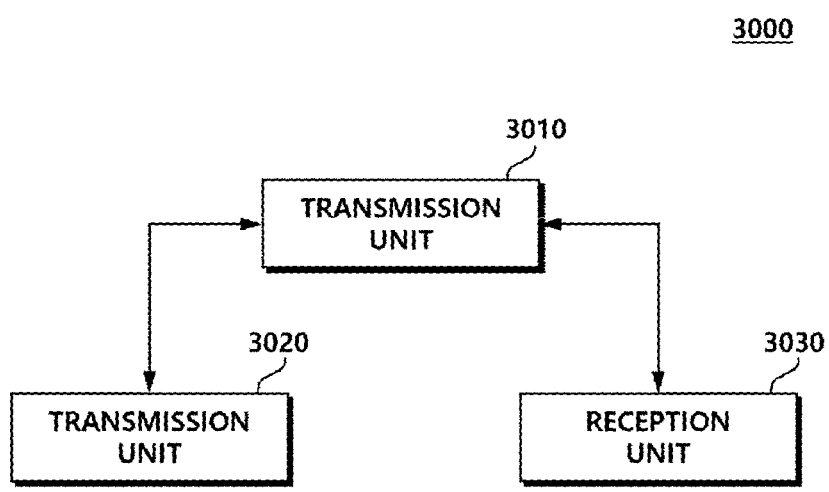
FIG. 30 is a block diagram illustrating a configuration of a base station according to another embodiment of the present disclosure.

FIG. 30 is a block diagram illustrating a configuration of a base station according to another embodiment of the present disclosure.

Referring to FIG. 30, a base station 3000 includes a control unit 3010, a transmission unit 3020, and a reception unit 3030.

The control unit 3010 controls a general operation of the base station 3000. The control unit 3010 may control a general operation for performing embodiments of the present disclosure.

The transmission unit 3020 and the reception unit 3030 may transmit and receive, with a terminal, a signal, message, or data necessary for performing embodiments of the present disclosure.

The transmission unit 3020 may transmit PRACH configuration information through an upper layer signaling. The PRACH configuration information may include parameters preambleInitialReceivedTargetPower and powerRampingStep.

In some embodiments of the present disclosure, the control unit 3010 may determine at least one parameter among parameters included in PRACH configuration information based on a repetition transmission level or number of a random access preamble of a terminal. The parameter determined by the control unit 3010 based on a repetition transmission level or number of a random access preamble may be parameters preambleInitialReceivedTargetPower and powerRampingStep, or a new parameter (for example, DELTA_PREAMBLE_REPETITION). The parameters may be used when a terminal determines a random access preamble transmission power.

The reception unit 3030 may receive a random access preamble from the terminal, and the transmission unit 3020 may transmit, to the terminal, a random access response (RAR) for the random access preamble.

Although a preferred embodiment of the present invention has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of performing a random access by a terminal, the method comprising:
    determining a preamble repetition level based on one of i) at least one of parameters that determine a transmission power of a random access preamble and ii) a coverage level;
    repeatedly transmitting a random access preamble to a base station through a predetermined number of subframes corresponding to the determined preamble repetition level; and
    receiving, from the base station, a random access response related to the random access preamble,
    wherein when the random access response has not been received from the base station, the transmitting of the random access preamble is repeated, and
    wherein the coverage level is configured based on a plurality of thresholds of the downlink path loss value received through a cell specific high layer signaling.

2. The method of claim 1, wherein the preamble repetition level is determined based on the downlink path loss value ($PL_c$).

3. A terminal for performing random access, the terminal comprising:
    a transmission unit configured to repeatedly transmit a random access preamble to a base station through a predetermined number of subframes corresponding to a preamble repetition level that is determined according to one of i) at least one of parameters that determine a transmission power of the random access preamble and ii) a coverage level; and
    a reception unit configured to receive, from the base station, a random access response related to the random access preamble,
    wherein when the reception unit has not received the random access response from the base station, the transmission unit repeats the transmitting of the random access preamble to the base station, and
    wherein the coverage level is configured based on a plurality of thresholds of the downlink path loss value received through a cell-specific high layer signaling.

4. The terminal of claim 3, wherein the preamble repetition level is determined based on the downlink path loss value ($PL_c$).

* * * * *